US012566583B2

(12) United States Patent
Shimizu et al.

(10) Patent No.:  US 12,566,583 B2
(45) Date of Patent:      Mar. 3, 2026

(54) INFORMATION PROCESSING APPARATUS, INFORMATION PROCESSING SYSTEM, INFORMATION PROCESSING METHOD, AND INFORMATION PROCESSING TERMINAL

(71) Applicants: SONY GROUP CORPORATION, Tokyo (JP); SONY INTERACTIVE ENTERTAINMENT INC., Tokyo (JP)

(72) Inventors: Takayoshi Shimizu, Tokyo (JP); Kazuharu Tanaka, Tokyo (JP); Masaaki Matsubara, Tokyo (JP)

(73) Assignees: SONY GROUP CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 238 days.

(21) Appl. No.: 18/032,477

(22) PCT Filed: Oct. 18, 2021

(86) PCT No.: PCT/JP2021/038378
§ 371 (c)(1),
(2) Date: Apr. 18, 2023

(87) PCT Pub. No.: WO2022/091832
PCT Pub. Date: May 5, 2022

(65) Prior Publication Data
US 2023/0385011 A1      Nov. 30, 2023

(30) Foreign Application Priority Data
Oct. 30, 2020     (JP) ................................. 2020-182458

(51) Int. Cl.
*G06F 3/14*          (2006.01)
*G06T 15/20*        (2011.01)

(52) U.S. Cl.
CPC ............ *G06F 3/1454* (2013.01); *G06T 15/20* (2013.01)

(58) Field of Classification Search
CPC ....... G06F 3/1454; G06F 9/451; G06T 15/20; G06T 13/40; H04N 7/157; A63F 13/35;
(Continued)

(56) References Cited

U.S. PATENT DOCUMENTS 9,253,183 B2 *   2/2016  Nathan .................. H04L 63/08
9,766,695 B2 *   9/2017  Kobayashi ............. G06F 3/015
(Continued)

FOREIGN PATENT DOCUMENTS

CN       110115842 A      8/2019
CN       110637274 A      12/2019
(Continued)

OTHER PUBLICATIONS

Play with friends in virtual space. VR SNS "ambr" starts open access, May 29, 2020, pp. 1-4, CUFtURE (see the translation of International Search Report below for concise relevance).
(Continued)

*Primary Examiner* — Vijay Shankar
(74) *Attorney, Agent, or Firm* — Paratus Law Group, PLLC

(57) ABSTRACT

Proposed is an information processing apparatus including a control unit that controls display of a virtual space, in which the control unit performs control to acquire communication information of one or more other users in another virtual space and present the acquired communication information by a virtual object disposed in the virtual space.

20 Claims, 14 Drawing Sheets

(58) Field of Classification Search
CPC ...... A63F 13/795; A63F 13/533; A63F 13/52;
A63F 13/537; A63F 13/525; A63F 13/53
See application file for complete search history.

(56) References Cited

U.S. PATENT DOCUMENTS

| | | | | |
|---|---|---|---|---|
| 10,384,126 | B2 * | 8/2019 | Lee | A63F 13/33 |
| 10,657,701 | B2 * | 5/2020 | Osman | A63F 13/25 |
| 10,701,318 | B2 * | 6/2020 | Valli | G06T 19/006 |
| 11,363,240 | B2 * | 6/2022 | Valli | G06T 19/006 |
| 12,009,088 | B2 * | 6/2024 | Thompson | G06V 20/20 |
| 2015/0143487 | A1 * | 5/2015 | Nathan | H04L 63/08 |
| | | | | 726/6 |
| 2015/0277547 | A1 * | 10/2015 | Kobayashi | G06F 3/011 |
| | | | | 345/156 |
| 2017/0021278 | A1 * | 1/2017 | Lee | A63F 13/53 |
| 2018/0005429 | A1 * | 1/2018 | Osman | A63F 13/56 |
| 2019/0253667 | A1 * | 8/2019 | Valli | H04N 13/243 |
| 2023/0072463 | A1 * | 3/2023 | Liu | A63F 13/795 |
| 2024/0385436 | A1 * | 11/2024 | Dehkordi | G06F 3/012 |
| 2025/0168308 | A1 * | 5/2025 | Patel | G06T 5/50 |

FOREIGN PATENT DOCUMENTS

| | | |
|---|---|---|
| JP | 2016-202686 A | 12/2016 |
| JP | 2018-109944 A | 7/2018 |
| JP | 2019-021122 A | 2/2019 |
| JP | 2019-522856 A | 8/2019 |
| JP | 2020-052775 A | 4/2020 |

OTHER PUBLICATIONS

Spatial, which can share virtual space, is free of charge. It is a business opportunity to take measures against "work-from-home fatigue", May 15, 2020, pp. 1-4, Mogura VR (see the translation of International Search Report below for concise relevance).

Takagi, Interaction method for sharing the feeling of going out using virtual avatars, Graduation thesis of College of Information Science, School of Informatics, University of Tsukuba, 2016, pp. 1-28 (see the translation of International Search Report below for concise relevance).

Dec. 28, 2021, Translation of International Search Report issued for related PCT Application No. PCT/JP2021/038378.

* cited by examiner

AFTER END OF LIVE EVENT

INFORMATION PROCESSING APPARATUS, INFORMATION PROCESSING SYSTEM, INFORMATION PROCESSING METHOD, AND INFORMATION PROCESSING TERMINAL

CROSS REFERENCE TO PRIOR APPLICATION

This application is a National Stage Patent Application of PCT International Patent Application No. PCT/JP2021/038378 (filed on Oct. 18, 2021) under 35 U.S.C. § 371, which claims priority to Japanese Patent Application No. 2020-182458 (filed on Oct. 30, 2020), which are all hereby incorporated by reference in their entirety.

FIELD

The present disclosure relates to an information processing apparatus, an information processing system, an information processing method, and an information processing terminal.

BACKGROUND

In a VR (Virtual Reality) application that has become widespread in recent years, a user can view a virtual space in which 3D models are arranged from an arbitrary viewpoint. Such a VR world can be provided mainly by using a non-transmissive HMD (Head Mounted Display) that covers a user's field of view with a display unit.

Regarding a technology for providing a virtual space, for example, Patent Document 1 below discloses a technology in which when a user operates an object (virtual object) of a camera disposed in the virtual space to capture an image of the inside of the virtual space, a photographic image generated by the capturing is drawn on an object (virtual object) of a monitor.

CITATION LIST

Patent Literature

Patent Literature 1: Japanese Patent Application Laid-open No. 2019-021122

SUMMARY

Technical Problem

Here, in the prior art document, image capturing experience in one virtual space is mentioned; however, communication with different virtual spaces is not considered.

Thus, the present disclosure proposes an information processing apparatus, an information processing system, an information processing method, and an information processing terminal capable of more easily presenting communication information in another virtual space and enhancing convenience of the virtual space.

Solution to Problem

According to the present disclosure, an information processing apparatus is proposed that includes a control unit that controls display of a virtual space, wherein the control unit performs control to acquire communication information of one or more other users in another virtual space and present the acquired communication information by a virtual object disposed in the virtual space.

According to the present disclosure, an information processing system is proposed that includes: an information processing terminal including a display unit and a communication unit; and an information processing apparatus including a control unit that controls display of a virtual space on the display unit, and a communication unit, wherein the control unit performs control to acquire communication information of one or more other users in another virtual space and present the acquired communication information by a virtual object disposed in the virtual space displayed on the display unit.

According to the present disclosure, an information processing method is proposed that includes: controlling display of a virtual space by a processor; and performing control to acquire communication information of one or more other users in another virtual space and present the acquired communication information by a virtual object disposed in the virtual space.

According to the present disclosure, an information processing terminal is proposed that includes: a communication unit; a display unit; and a control unit that performs control to display an image of a virtual space, received from an information processing apparatus by the communication unit, on the display unit, wherein the control unit displays an image in which communication information of one or more other users in another virtual space is presented by a virtual object disposed in the virtual space.

BRIEF DESCRIPTION OF DRAWINGS

FIG. 12 is a diagram for explaining another presentation example of communication information of a special room according to another embodiment.

DESCRIPTION OF EMBODIMENTS

Figure 1:
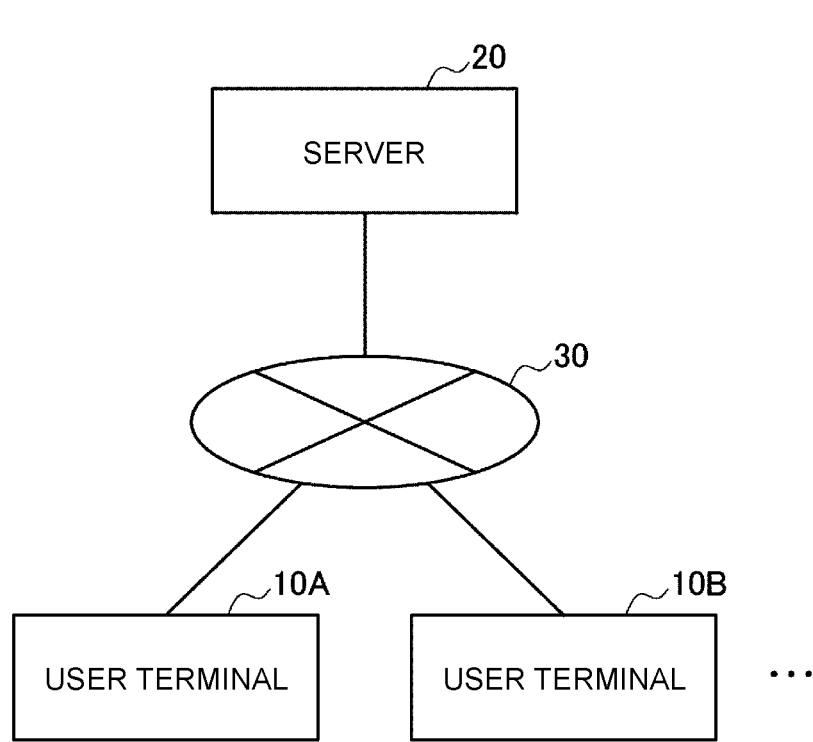
FIG. 1 is a diagram illustrating a configuration example of an information processing system according to an embodiment of the present disclosure.

Hereinafter, preferred embodiments of the present disclosure will be described in detail with reference to the accompanying drawings. In the present specification and the drawings, components having substantially the same functional configuration are denoted by the same reference numerals, and redundant description is omitted.

The description will be given in the following order.
1. Overview
2. Configuration Example
3. Operation Processing
4. Other Embodiments
5. Application Example
6. Supplement

1. Overview

As an embodiment of the present disclosure, a mechanism for more easily presenting communication information in another virtual space and enhancing convenience of a virtual space (VR: Virtual Reality) will be described.

FIG. 1 is a diagram illustrating a configuration example of an information processing system according to an embodiment of the present disclosure. As illustrated in FIG. 1, the information processing system according to the present embodiment includes a user terminal 10 (user terminals 10A, 10B, and . . . ) used by each user and a server 20 that provides information of the virtual space to each of the user terminals 10. The user terminal 10 and the server 20 are communicably connected via a network 30 to transmit and receive data.

The virtual space is presented using, for example, a non-transmissive HMD (Head Mounted Display) that covers the user's field of view. In the present embodiment, as an example, a case where the user terminal 10 is realized by the HMD is assumed.

The HMD is worn on the head of the user. Further, the HMD may include an image display unit for each of the left and right eyes of the wearing user. When the HMD is configured to block an external world of the user, it is possible to increase a virtual reality feeling (sense of immersion in the virtual space) at the time of viewing. The HMD displays an image from a user's viewpoint in the virtual space. Such an image may be generated by the server 20 and displayed on the HMD in real time, or may be generated by the HMD based on information acquired from the server 20. Reality of a virtual world can be further enhanced by changing a video of the virtual space viewed by the user (change in the user's viewpoint in the virtual space) while following a motion of the user detected by a motion sensor provided in the HMD. Further, the HMD can also display different videos in the left and right eyes, and can present a 3D image by displaying an image having parallax with respect to the left and right eyes. Furthermore, the HMD uses headphones in combination, and can also present information (voice) of the virtual space to the user's sense of hearing as well as a user's vision.

(Arrangement of Problems)

Here, a plurality of rooms (hereinafter, referred to as virtual rooms) can be prepared in the virtual space. Although referred to as "room" in the present specification, each virtual room is one of the virtual spaces, and the size of the space, the number of users, the shape of a 3D model to be disposed, and the like are not particularly limited.

Figure 2:
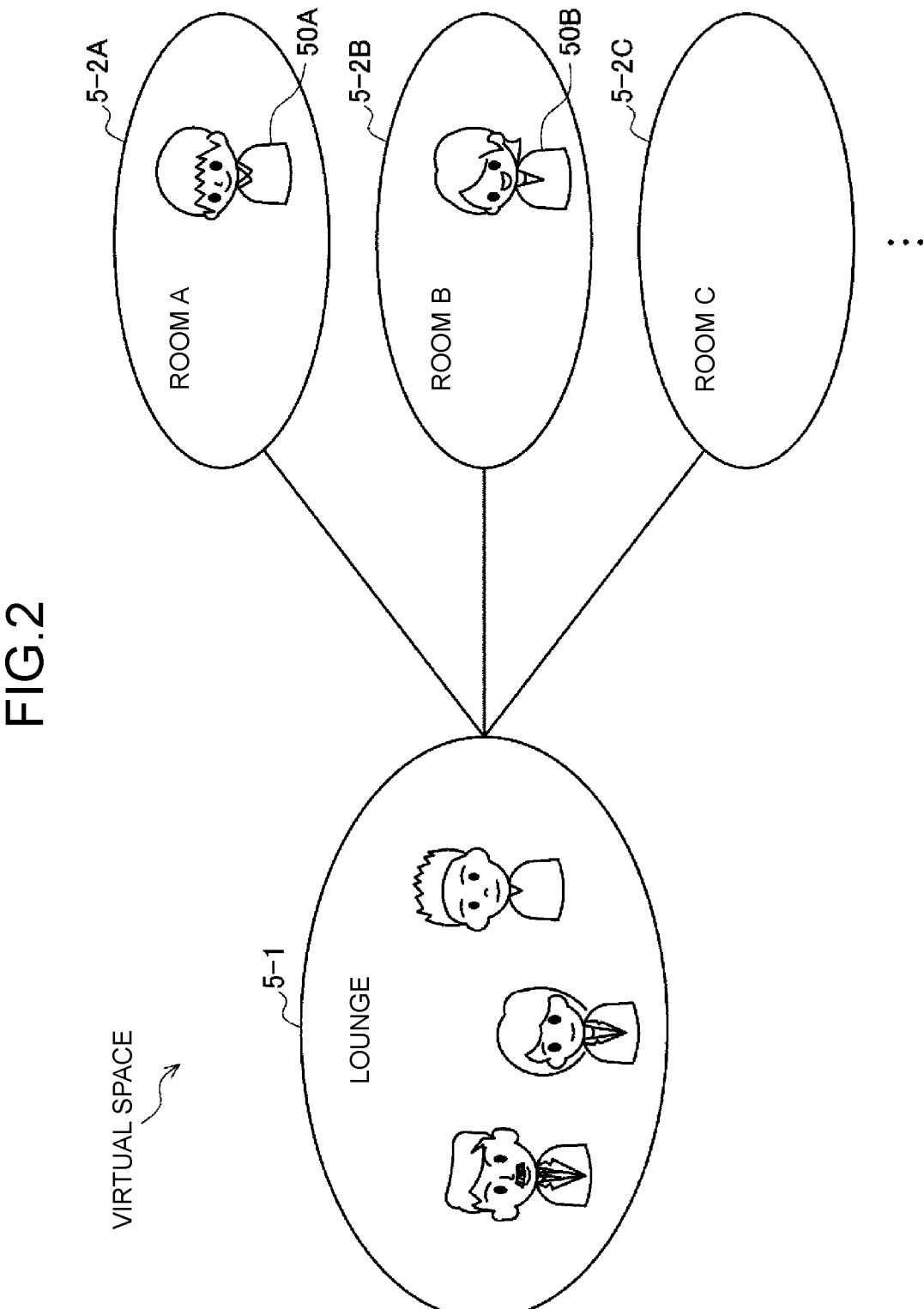
FIG. 2 is a diagram illustrating an example of a case where a virtual space is configured by a plurality of virtual rooms.

FIG. 2 is a diagram illustrating an example of a case where the virtual space is configured by the plurality of virtual rooms. In the example illustrated in FIG. 2, it is assumed that the virtual space includes a lounge 5-1 that corresponds to an entrance, a forum, or the like of the virtual space and that can be used by anyone, and rooms 5-2A to 5-2C, . . . accessible from the lounge 5-1. When the user logs in to the virtual space, the user may first enter the lounge 5-1, and select the room as a movement destination from the lounge 5-1. The room 5-2 may be a virtual room constructed as a room of each individual user, or may be a virtual room constructed as an event venue where a specific event is held.

Here, for example, when a user 50A in the room 5-2A wants to have a conversation with a user 50B in the room 5-2B, both the users need to be in the same space; therefore, one of the users needs to move to the other party's room (virtual space), or both the users need to move to another virtual space such as the lounge.

However, the spatial movement involves scene movement processing, and a large processing load and processing time are generated in the user terminal 10 and the server 20. The scene movement processing is processing of rewriting all data in the virtual space such as background data. In general, the virtual space includes background data and a large number of virtual objects (including participant avatars). In each virtual object, many parameters such as polygon mesh information, vertex information, material information, rendering information of gloss and shadow, physical calculation information such as collision, friction, and light, three-dimensional spatial coordinate position, animation, color information, transparency, effects of video and sound, and control script are set, and when all parameters are combined, an enormous amount of setting data is obtained. For example, when the user 50A spatially moves from the room 5-2A to the room 5-2B, it is necessary to replace and reconstruct these enormous amounts of setting data in the user terminal 10 and the server 20. As an example, it is assumed that it takes about 30 seconds or 40 seconds to 1 minute to replace and reconstruct the setting data in such spatial movement, and to read the latest scene.

When the user 50A has a conversation with the user 50B in the room 5-2B and then returns to the original room 5-2A again, similarly, an enormous amount of setting data in the spatial movement is replaced, reconstructed, and the like again, and a processing load and a waiting time occur. Such processing related to the new construction of the virtual space due to the spatial movement and the like can be said to be very inefficient processing when only a little conversation is performed with the user in another virtual space such as another room. In addition, the occurrence of a waiting time in the new construction of the virtual space due to the spatial movement and the like becomes a stress for the user, and comfort is impaired. The new construction of the virtual space by such spatial movement and the like may cause a large processing load and long processing time regardless of whether the virtual space is constructed on the server side or the user terminal side.

Thus, an embodiment according to the present disclosure proposes an information processing system capable of more easily presenting communication information in another virtual space and enhancing convenience of the virtual space.

Specifically, for example, communication information of one or more other users in another virtual space is acquired, and the acquired communication information is displayed (drawn) in real time on a virtual object (in the present embodiment, a "window" is assumed and referred to as a virtual window) disposed in the virtual space where the user is present. The communication information is information for communicating with a partner, and for example, an image (video), a voice, a text, and the like are assumed.

Hereinafter, each configuration and operation processing of the information processing system according to the present embodiment will be described.

2. Configuration Example

Figure 3:
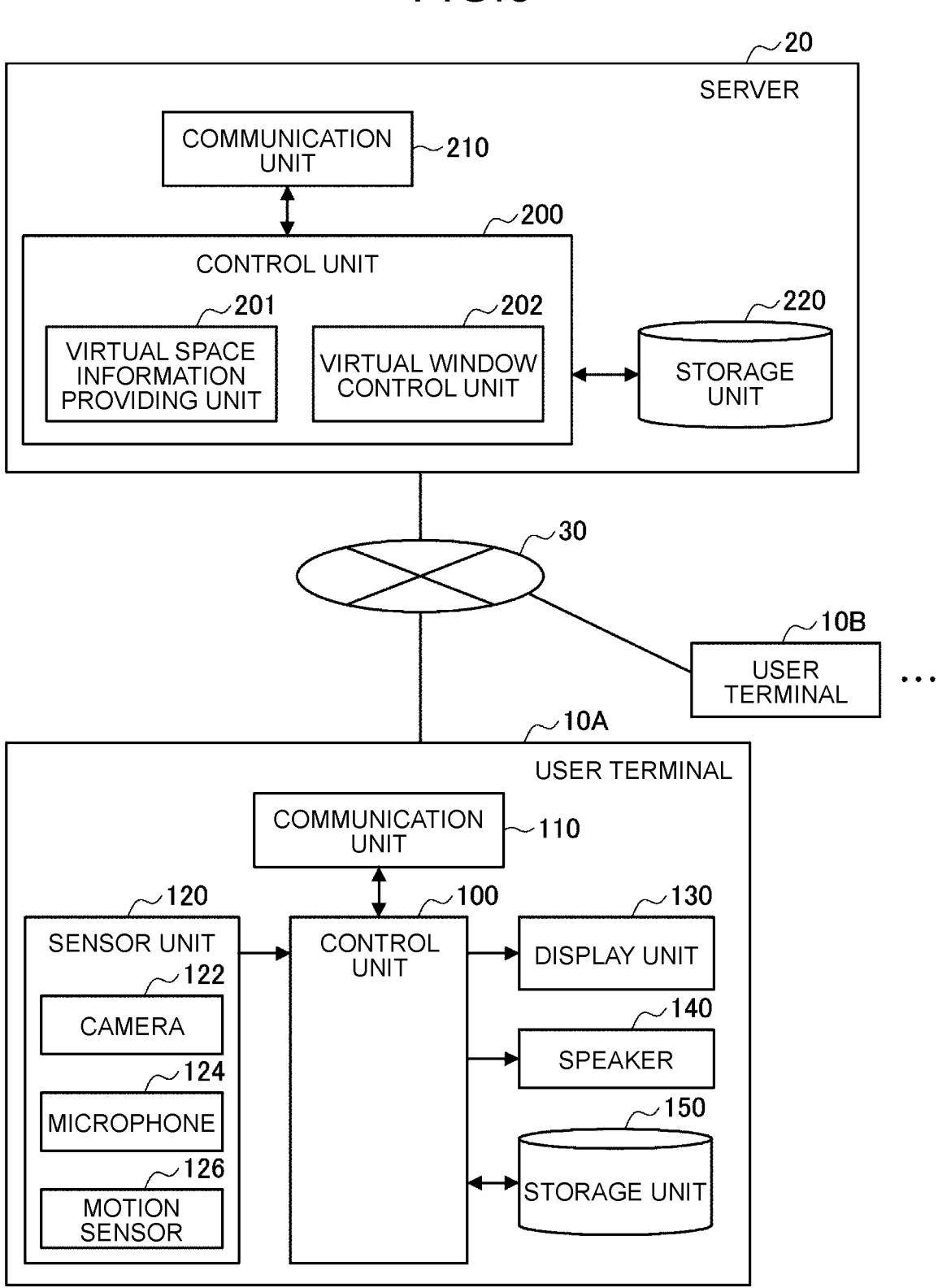
FIG. 3 is a block diagram illustrating an example of configurations of a server and a user terminal included in the information processing system according to the present embodiment.

FIG. 3 is a block diagram illustrating an example of configurations of the server 20 and the user terminal 10 included in the information processing system according to the present embodiment. Hereinafter, each device will be specifically described.

<2-1. Server 20>

As illustrated in FIG. 3, the server 20 includes a control unit 200, a communication unit 210, and a storage unit 220.

(Communication Unit 210)

The communication unit 210 is communicably connected to an external device in a wired or wireless manner to transmit and receive data. For example, the communication unit 210 is connected to the network 30 and transmits and receives data to and from the user terminal 10. The communication unit 210 transmits information necessary for constructing the virtual space, image data of the user's viewpoint in the virtual space, information of another avatar participating in the virtual space, and the like to the user terminal 10. The avatar is a virtual object disposed in the virtual space as a personal character of each user, and an operation and motion (motion of entire body, motion of hands and fingers, motion of feet, motion of head, expression, and the like) of the user are reflected in the avatar of the user in the virtual space. The operation and motion of the user can be detected by the sensor unit 120 of the user terminal 10, a controller held by the user, a sensor device worn by the user, a large number of cameras provided around the user, and the like. The avatar may be 2D live-action or 3D CG. Furthermore, the avatar may be a 3D CG more similar to an actual photograph, which is generated by the Volumetric Capture technology. The Volumetric Capture technology is a technology capable of generating the 3D CG more similar to an actual photograph in real time from a captured image and 3D data obtained by capturing an image of a user by a large number of cameras in a real space. The user's viewpoint in the virtual space may be an avatar viewpoint (in this case, the user's own avatar does not appear on the screen), or may be a viewpoint from a place at a certain distance from the avatar such that the user's own avatar appears on the screen (in this case, the viewpoint follows the avatar). The user can arbitrarily switch the user's viewpoint.

The communication unit 210 is communicably connected to an external device or the network 30 by, for example, a wired/wireless LAN (Local Area Network), Wi-Fi (registered trademark), Bluetooth (registered trademark), a mobile communication network (LTE (Long Term Evolution), 3G (third generation mobile communication system), 4G (fourth generation mobile communication system), 5G (fifth generation mobile communication system), or the like.

(Control Unit 200)

The control unit 200 functions as an arithmetic processing device and a control device, and controls the overall operation in the server 20 according to various programs. The control unit 200 is realized by, for example, an electronic circuit such as a CPU (Central Processing Unit) or a microprocessor. Furthermore, the control unit 200 may include a ROM (Read Only Memory) that stores programs, operation parameters, and the like to be used, and a RAM (Random Access Memory) that temporarily stores parameters and the like that change appropriately.

The control unit 200 according to the present embodiment also functions as a virtual space information providing unit 201 and a virtual window control unit 202.

The virtual space information providing unit 201 has a function of providing the information of the virtual space to the user terminal 10 and displaying an image of the virtual space on the user terminal 10. The image of the virtual space is the image (video) from the user's viewpoint in the virtual space.

The information of the virtual space provided by the virtual space information providing unit 201 is information used at least for presenting an image of the virtual space from the user's viewpoint to the user's vision in the user terminal 10. Examples of the information include information necessary for constructing the virtual space (background data and various parameters of each virtual object), the image data of the user's viewpoint in the virtual space, the information of other avatars participating in the virtual space, and the like. Furthermore, when the user enters a new virtual space by login or spatial movement, the virtual space information providing unit 201 may present all data (background data, CG of another avatar, various parameters of virtual space, and the like) for constructing the virtual space to the user terminal 10. In this case, after the virtual space is constructed, the virtual space information providing unit 201 may continuously transmit difference information such as real-time position information or motion information of another avatar to the user terminal 10.

The image of the virtual space from the user's viewpoint displayed on the user terminal 10 may be generated by the virtual space information providing unit 201 or may be generated based on information acquired by the user terminal 10 from the virtual space information providing unit 201. When the virtual space information providing unit 201 generates the image of the virtual space from the user's viewpoint, the image of the virtual space may be generated after causing the user's viewpoint to follow the motion of the user in the real space based on the position information (for example, the position of the head), posture information, and motion information (for example, the motion of the head and the motion of the limbs) of the user continuously transmitted from the user terminal 10. The information of the virtual space provided by the virtual space information providing unit 201 can also include voice information, vibration information, and the like.

The construction of the virtual space (for example, the lounge 5-1 and the rooms 5-2A to 5-2C . . . illustrated in FIG. 2) may be performed by the server 20 or may be performed by the user terminal 10 used by each user. For example, the virtual space (for example, the lounge 5-1) shared by a large number of users (that is, virtual space where a large number of users can enter) may be constructed by the server 20, and a room of an individual user (that is, virtual space where only the user can enter) may be constructed by each of the user terminals 10.

The virtual window control unit 202 has a function of controlling a virtual window that presents communication information in another virtual space. The communication information is information for communicating with a partner, and for example, an image (video), a voice, a text, and the like are assumed. The virtual window control unit 202 according to the present embodiment displays (draws) the communication information of one or more other users acquired from another virtual space in real time in the virtual window disposed in the virtual space where the user is present, thereby more easily presenting the communication information in another virtual space and enhancing the convenience of the virtual space. That is, it is possible to have a conversation with another user in another virtual space without performing spatial movement, and the processing load and the processing time (such as the processing load and the processing time for reading enormous setting data of all virtual objects) generated in the case of spatial movement are reduced. In the presentation of the communication information in another virtual space, it is sufficient to present an image (video), a voice, or a text; therefore, the processing load and the processing time are relatively light, and it is possible to immediately start a conversation with another user in another virtual space.

Figure 4:
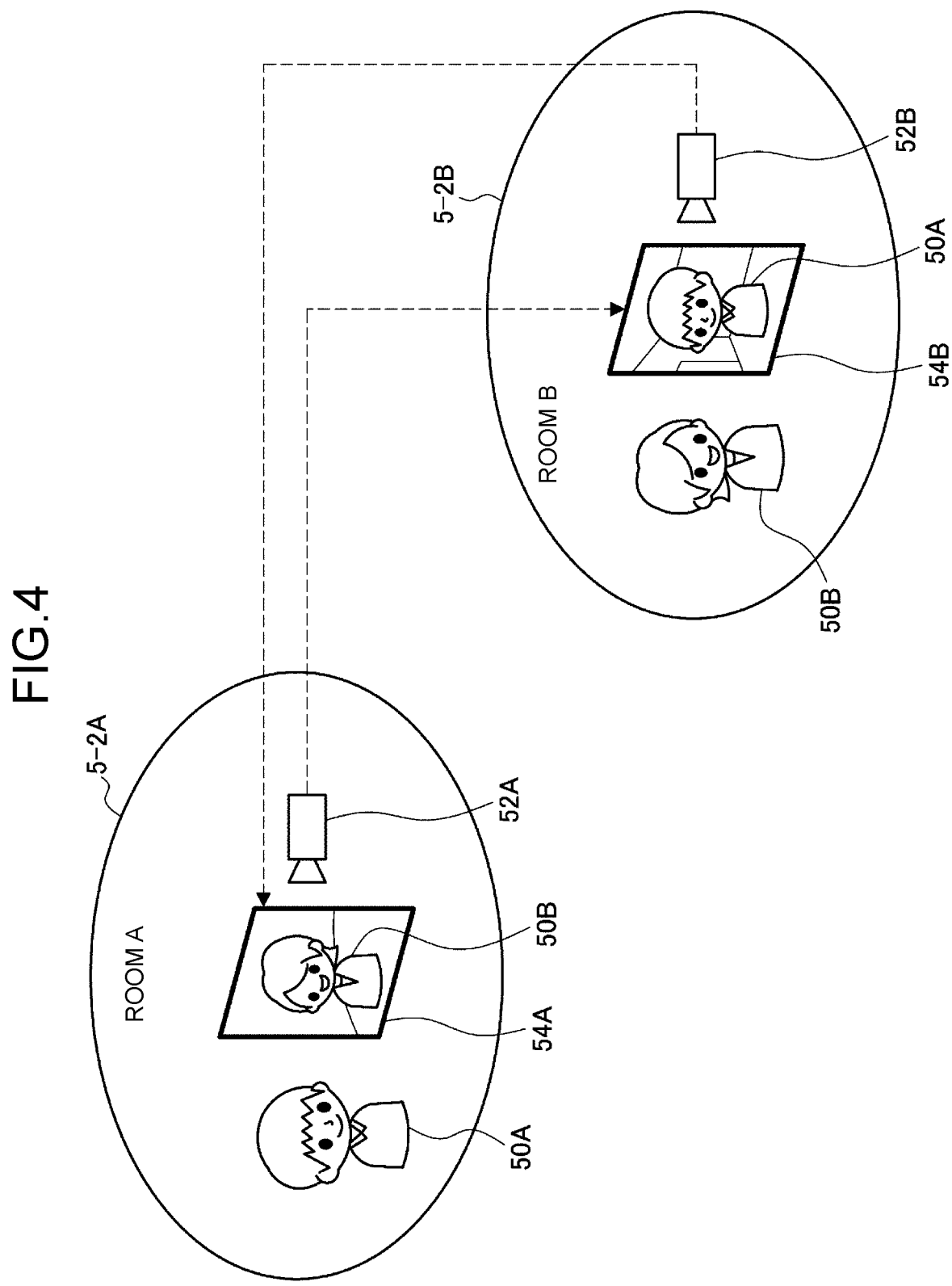
FIG. 4 is a diagram for explaining communication between the virtual spaces using a virtual window according to the present embodiment.

Here, FIG. 4 illustrates a diagram for explaining communication between the virtual spaces using the virtual window according to the present embodiment. As illustrated in FIG. 4, for example, when the user 50A in the room 5-2A and the user 50B in the room 5-2B want to have a conversation, the virtual window control unit 202 arranges a virtual window 54 (for example, a virtual object generated by 3D CG) and a virtual camera 52 (image capturing position for capturing an image of the virtual space) in each virtual space. Then, the virtual window control unit 202 performs control to display the video captured by each of the virtual cameras 52 on the virtual window 54 of the virtual space of the other party in real time (for example, so-called live streaming distribution may be used). That is, the virtual window control unit 202 displays the video, obtained by capturing the image of the user 50A by the virtual camera 52A disposed in the room 5-2A, on the virtual window 54B disposed in the room 5-2B. At the same time, the virtual window control unit 202 displays the video, obtained by capturing the image of the user 50B by the virtual camera 52B disposed in the room 5-2B, on the virtual window 54A disposed in the room 5-2A. At this time, the voice is collected and output in the virtual space of the other party. As a result, each user can have a conversation (communication) using video and voice via the virtual window 54.

In this case, although the conversation using video and voice is realized as an example, the present embodiment is not limited thereto, and a conversation (chat) using a text may be performed via the virtual window 54. Furthermore, communication using at least one of video, voice, and text may be performed via the virtual window 54.

The shape, size, and arrangement place of the virtual window 54 are not particularly limited. In the present specification, it is assumed that the virtual window 54, which is a virtual object imitating a "window", is used; however, the present disclosure is not limited thereto, and any virtual object may be used as long as the virtual object has a region for presenting communication information acquired from another virtual space. For example, the communication information acquired from another virtual space may be presented by a virtual object such as a screen, a table, a wall, a ceiling, a door, or a display.

When the video captured by the virtual camera 52 is displayed on the virtual window 54, the virtual camera 52 may be disposed at a position where an image of the user (avatar) viewing the virtual window 54 is captured from the front so that a line of sight of the user and the other party user in the video match. The arrangement of the virtual camera 52 is setting of an image capturing position and an image capturing direction for capturing the virtual space. In FIG. 4, the virtual camera 52 is illustrated in order to clearly indicate the image capturing position and the direction; however, even if the virtual camera 52 is disposed in front of the eyes of the user instead of the object actually drawn in the virtual space, the virtual camera does not disturb the user's field of view.

Figure 5:
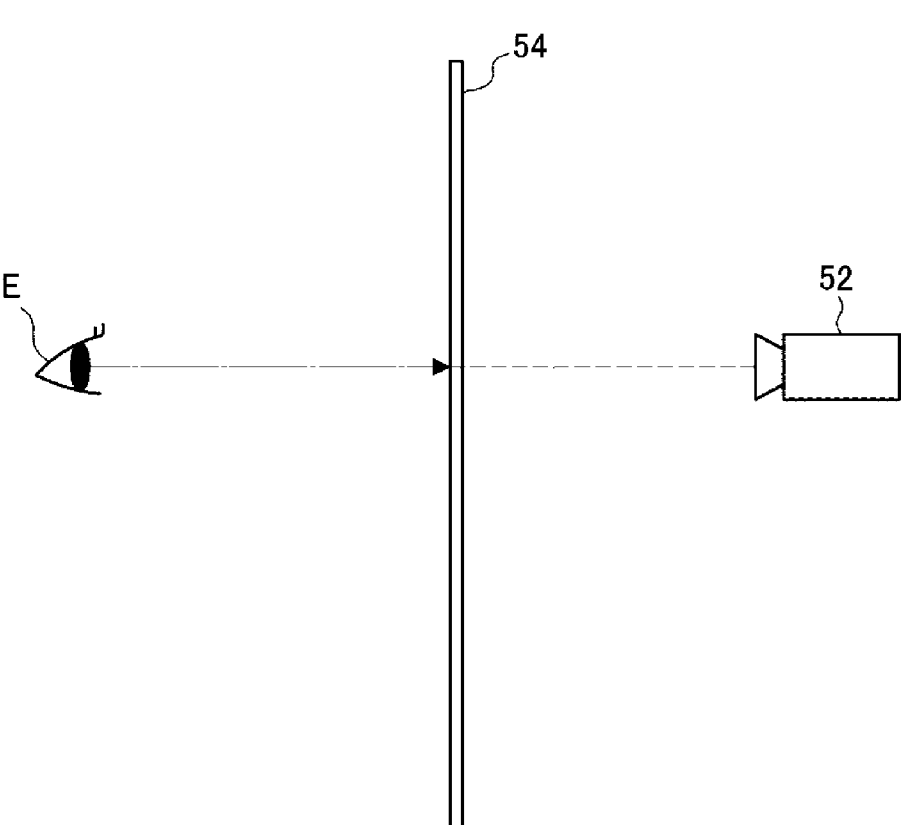
FIG. 5 is a diagram illustrating an arrangement example of a virtual camera according to the present embodiment.

Here, an arrangement example of the virtual camera 52 is illustrated in FIG. 5. As illustrated in FIG. 5, for example, the virtual camera 52 may be disposed behind the virtual window 54 (or at the position of the virtual window 54) at a position corresponding to the height of the user's eyes (that is, it is a user viewpoint position in the virtual space, and is indicated as a viewpoint E in FIG. 5). The virtual window control unit 202 can capture the image of the user facing the virtual window 54 from the front (through the virtual window 54) by excluding the virtual window 54 disposed in the virtual space from the captured image when capturing the image of the user with the virtual camera 52 from a back side of the virtual window 54. In this case, the virtual camera 52 is adjusted to the height of the user's viewpoint as an example, but may be adjusted to the position (height) of the head of the user (avatar) as another example. Furthermore, the virtual camera 52 may be disposed at the position of the eyes (or head) of the other party user appearing in the virtual window 54 to capture the image of the user facing the virtual window 54. As described above, the virtual camera 52 (image capturing position) can be freely disposed even at a position where a camera becomes an obstacle or cannot be installed in the real space, and the users having a conversation via the virtual window 54 can look at each other.

(Storage Unit 220)

The storage unit 220 is realized by the ROM (Read Only Memory) that stores programs, operation parameters, and the like used for processing of the control unit 200, and the RAM (Random Access Memory) that temporarily stores parameters and the like that change appropriately.

Although the configuration of the server 20 has been specifically described above, the configuration of the server 20 according to the present disclosure is not limited to the example illustrated in FIG. 3. For example, the server 20 may be realized by a plurality of devices. Although the server 20 is used as an example of the information processing apparatus that provides the information of the virtual space and controls display of the virtual space, the information processing apparatus is not limited to the server on the network. For example, the information processing apparatus may be realized by an intermediate server (distributed server), a local edge server, a dedicated terminal disposed in the same space as the user terminal 10, a smartphone, a tablet terminal, a PC (personal computer), or the like. At least a part or all of the functions of the server 20 may be realized by an intermediate server, a local edge server, the user terminal 10, a dedicated terminal disposed in the same space as the user terminal 10, a smartphone, a tablet terminal, a PC (personal computer), or the like.

<2-2. User Terminal 10>

As illustrated in FIG. 3, the user terminal 10 includes a control unit 100, a communication unit 110, a sensor unit 120, a display unit 130, a speaker 140, and a storage unit 150. As an example, the user terminal 10 according to the present embodiment can be realized by a non-transmissive HMD that displays the image of the virtual space.

(Communication Unit 110)

The communication unit 110 is communicably connected to an external device in a wired or wireless manner to transmit and receive data. For example, the communication unit 110 is connected to the network 30 and transmits and receives data to and from the server 20 on the network. The communication unit 110 receives, for example, the information of the virtual space from the server 20. Furthermore, the communication unit 110 transmits sensing data (position information, posture information, motion information, voice, operation information, and the like) detected by the sensor unit 120 provided in the user terminal 10 to the server 20.

The communication unit 110 is communicably connected to an external device or the network 30 by, for example, a wired/wireless LAN (Local Area Network), Wi-Fi (registered trademark), Bluetooth (registered trademark), a mobile communication network (LTE (Long Term Evolution), 3G (third generation mobile communication system), 4G (fourth generation mobile communication system), 5G (fifth generation mobile communication system), or the like.

(Sensor Unit 120)

The sensor unit 120 has a function of sensing various types of information regarding the user. For example, the sensor unit 120 may be a camera 122, a microphone (hereinafter, referred to as a microphone) 124, and a motion sensor 126. A plurality of sensors may be provided.

The camera 122 may be an outward camera that captures an image of the real space and an inward camera that captures an image of the user's eye. The outward camera is used, for example, when detecting a position (self-position) of the user terminal 10. Generally, recognition of the self-position includes an outside-in method using a sensor installed outside (on the environment side) of the user terminal 10, an inside-out method using a sensor mounted on the user terminal 10, and a hybrid method which is a combination of the outside-in method and the inside-out method. The outward camera is also used to detect an obstacle or the like in the surroundings. The inward camera is used, for example, to detect information regarding a user's line of sight (line-of-sight direction, motion of eyeball, and the like).

The microphone 124 collects spoken voice of the user and outputs voice data to the control unit 100.

The motion sensor 126 is used to detect the posture and motion of the user. For example, the motion sensor 126 may include an acceleration sensor, a gyro sensor, and a geomagnetic sensor.

In addition, the sensor unit 120 may include a distance measuring sensor that measures a distance to a real object existing around in the real space by an infrared sensor or an ultrasonic sensor. Further, the sensor unit 120 may include a biological sensor that detects a heartbeat, a pulse, a perspiration amount, respiration, a blood pressure, an electroencephalogram, a myoelectric value, a fingerprint, a palm print, and the like. Furthermore, the sensor unit 120 may include a position measurement unit that calculates the absolute or relative position of the user terminal 10. As the position measurement unit, for example, a GNSS (Global Navigation Satellite System) that receives a radio wave from an artificial satellite and detects a current position where the user terminal 10 is present may be used. In addition to the GNSS, Wi-Fi (registered trademark), Bluetooth (registered trademark), transmission and reception with a mobile phone, a PHS, a smartphone, and the like, or a method of detecting a position by short-range communication and the like may be used. The position measurement unit may estimate information indicating a change in a relative position based on a detection result of an acceleration sensor, an angular velocity sensor, and the like.

The sensor unit 120 may include a touch sensor, a switch, a button, and the like. These function as an operation input unit that detects a user operation.

(Display Unit 130)

For example, when the user terminal 10 is configured as an HMD, the display unit 130 includes left and right screens fixed respectively to the left and right eyes of the user, and has a function of displaying a left-eye image and a right-eye image. The screen of the display unit 130 includes, for example, a display panel such as a liquid crystal display (LCD) or an organic EL (Electro Luminescence) display, or a laser scanning display such as a retinal direct-drawing display. The display unit 130 may include an imaging optical system that enlarges and projects a display screen to form an enlarged virtual image having a predetermined view angle on the user's pupil.

(Speaker 140)

The speaker 140 has a function of outputting voice. For example, the speaker 140 may be configured as a headphone, an earphone, or a bone conduction speaker.

(Storage Unit 150)

The storage unit 150 is realized by the ROM (Read Only Memory) that stores programs, operation parameters, and the like used for processing of the control unit 100, and the RAM (Random Access Memory) that temporarily stores parameters and the like that change appropriately.

(Control Unit 100)

The control unit 100 functions as an arithmetic processing device and a control device, and controls the overall operation in the user terminal 10 according to various programs. The control unit 100 is realized by, for example, an electronic circuit such as a CPU (Central Processing Unit) or a microprocessor. Furthermore, the control unit 100 may include a ROM (Read Only Memory) that stores programs, operation parameters, and the like to be used, and a RAM (Random Access Memory) that temporarily stores parameters and the like that change appropriately.

The control unit 100 according to the present embodiment performs control to transmit sensing data (position information, motion information, voice, operation information, and the like) detected by the sensor unit 120 from the communication unit 110 to the server 20. Furthermore, the control unit 100 may perform control to transmit information (estimation information of the self-position and posture, and the like) calculated based on the sensing data detected by the sensor unit 120 from the communication unit 110 to the server 20.

The control unit 100 performs control to display the image from the user's viewpoint in the virtual space on the display unit 130 based on the information of the virtual space received from the server 20. Here, the image from the user's viewpoint in the virtual space displayed on the display unit 130 may be generated by the control unit 100 based on the information of the virtual space received from the server 20. When the image from the user's viewpoint is generated by the control unit 100, the control unit 100 constructs the virtual space based on the information (background data, parameters of various virtual objects (including avatars of other users) existing in the virtual space, and the like) of the virtual space received from the server 20. Information and the like regarding the motion of the avatar of another user can be transmitted from the server 20 in real time.

The control unit 100 may perform control to receive the image from the user's viewpoint in the virtual space generated by the server 20 by the communication unit 110 and display the image on the display unit 130. In this case, the control unit 100 transmits the sensing data detected by the sensor unit 120 from the communication unit 110 to the server 20, and can receive the image of the virtual space reflecting a change in the position and posture of the user in the real space. Furthermore, the control unit 100 may perform control to display the received image of the virtual space on the display unit 130 after correcting the received image of the virtual space based on more recently acquired sensing data for delay compensation by communication.

The image of the virtual space display-controlled by the control unit 100 can include the virtual window 54 that presents the communication information in another virtual space as described above. Here, FIG. 6 illustrates a display example of an image of the virtual space in which the virtual window 54 is disposed according to the present embodiment.

Figure 6:
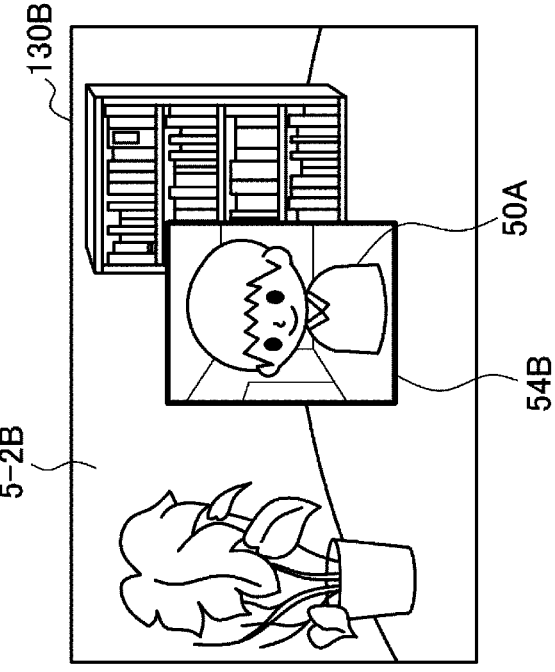
FIG. 6 is a diagram illustrating a display example of an image of the virtual space in which the virtual window is disposed according to the present embodiment.
Figure 6:
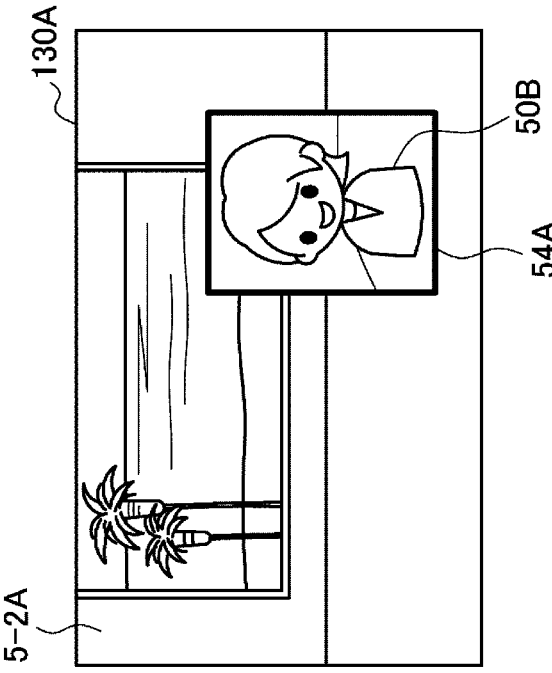

The example illustrated on the left of FIG. 6 is an example of an image from the viewpoint of the user 50A in the room 5-2A displayed on the display unit 130A provided in the user terminal 10A of the user 50A in the room 5-2A. The image from the viewpoint of the user 50A in the room 5-2A includes the display of the virtual window 54A disposed in the room 5-2A. On the virtual window 54A, a video of another user (in this case, (the avatar of) the user 50B) captured in another virtual space (in this case, the room 5-2B) is displayed in real time (a live streaming mechanism may be used). When the room 5-2A is constructed with the user terminal 10A, the server 20 may perform processing of transmitting the video and voice of (the avatar of) the user 50B captured in the room 5-2B to the user terminal 10A in real time.

On the other hand, the example illustrated on the right of FIG. 6 is an example of an image from the viewpoint of the user 50B in the room 5-2B displayed on the display unit 130B provided in the user terminal 10B of the user 50B in the room 5-2B. The image from the viewpoint of the user 50B in the room 5-2B includes the display of the virtual window 54B disposed in the room 5-2B. On the virtual window 54B, a video of another user (in this case, (the avatar of) the user 50A) captured in another virtual space (in this case, the room 5-2A) is displayed in real time (the live streaming mechanism may be used). When the room 5-2B is constructed with the user terminal 10B, the server 20 may perform processing of transmitting the video and voice of (the avatar of) the user 50A captured in the room 5-2A to the user terminal 10B in real time.

Although the configuration of the user terminal 10 has been specifically described above, the configuration of the user terminal 10 according to the present embodiment is not limited to the example illustrated in FIG. 3. For example, the user terminal 10 may be realized by a plurality of devices. Specifically, the user terminal 10 may be realized by a system configuration including a display device (including at least the display unit 130) realized by the HMD or the like and an information processing terminal (including at least the control unit 100) realized by a smartphone, a tablet terminal, a PC, or the like. At least a part of the sensor unit 120 may be provided in an external device (a wearable device or the like worn by the user) that is communicably connected to the user terminal 10. The sensing data detected by a controller held by the user's hand may be input to the user terminal 10.

Each processing performed by the control unit 100 described above may be realized by an external device such as the server 20 on the network, an intermediate server, a local edge server, a dedicated terminal disposed in the same space as the user, a smartphone, a tablet terminal, or a PC.

3. Operation Processing

Figure 7:
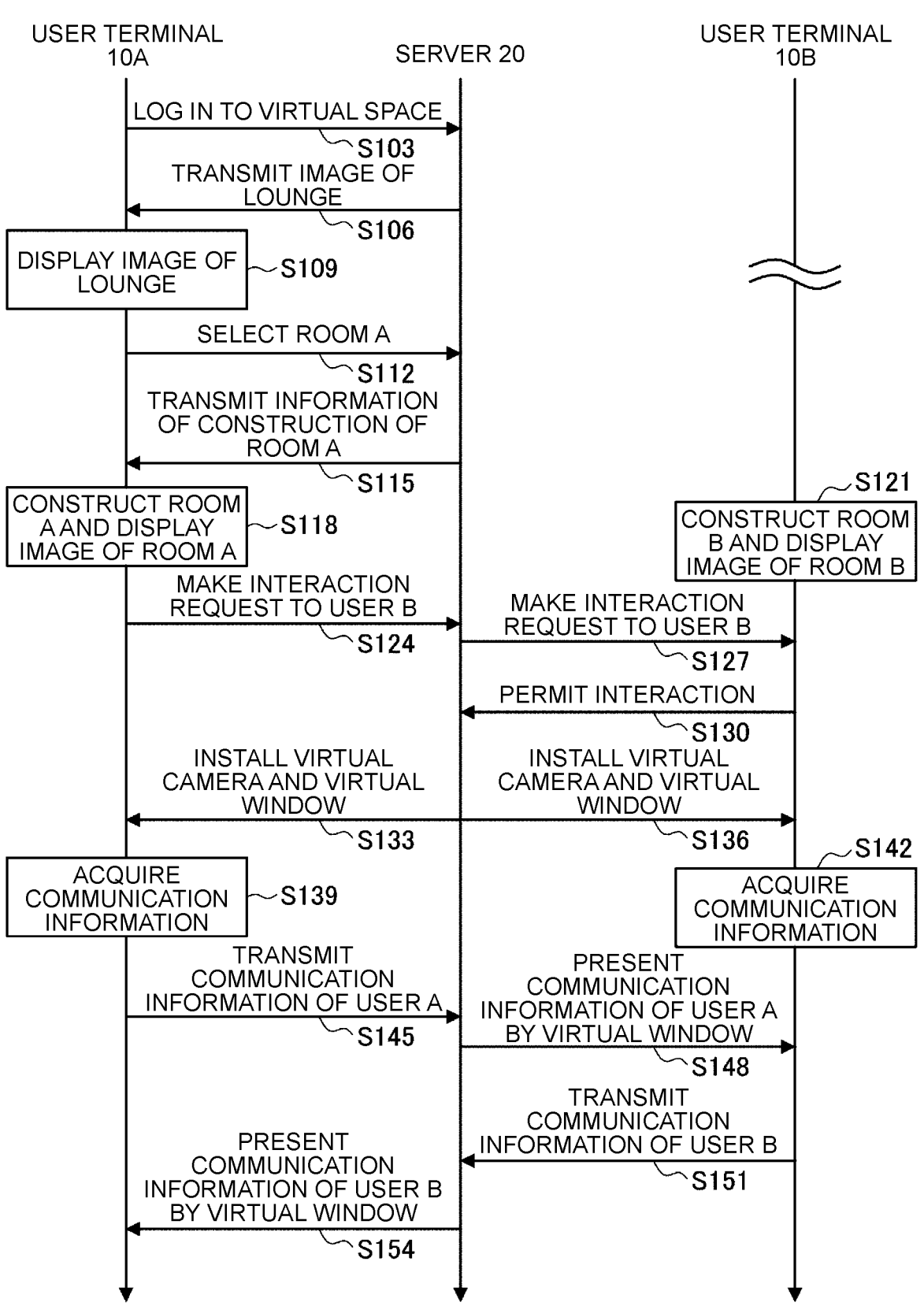
FIG. 7 is a sequence diagram illustrating an example of a flow of operation processing of the information processing system according to the present embodiment.

Next, operation processing of the information processing system according to the present embodiment will be specifically described with reference to FIG. 7. FIG. 7 is a sequence diagram illustrating an example of a flow of the operation processing of the information processing system according to the present embodiment.

As illustrated in FIG. 7, first, the user terminal 10A accesses the server 20 that provides the information on the virtual space and logs in to the virtual space (step S103). Specifically, user authentication or the like can be performed based on a user ID and the like registered in advance.

Next, the server 20 generates an image of the lounge which is one of the virtual spaces (an image from the user's viewpoint in the lounge) and transmits the image to the user terminal 10A (step S106). In this case, as an example, a case where the specification is such that the user who has logged in to the virtual space first enters the lounge will be described. The lounge is constructed by, for example, the server 20, and the server 20 sets the first user's viewpoint assuming that the user enters from a predetermined entrance (vestibule) in the lounge. In this case, although it has been described that the user enters the lounge first as an example, the present embodiment is not limited thereto, and the user may arbitrarily select which virtual space the user enters after logging in.

Next, the user terminal 10A displays the image of the lounge (the image from the user's viewpoint in the lounge) on the display unit 130 (step S109). As described above, the user's viewpoint may be the viewpoint of the avatar drawn in the virtual space as a personal character of the user (in this case, the avatar of the user is not included in the user's field of view), or may be the viewpoint including the avatar of the user in the field of view. Furthermore, the user's viewpoint can be arbitrarily switched.

Next, when the user selects the room A that is his/her room using the user terminal 10A (step S112), the server 20 transmits information of construction of the room A to the user terminal 10A (step S115). In this case, a case where the room (virtual space) of each individual user is constructed by the user terminal 10 will be described as an example; however, the present embodiment is not limited to this case. For example, when the room of the individual user is constructed by the server 20, the server 20 constructs the room A, generates an image from the viewpoint of the user A in the room A, and transmits the image to the user terminal 10A.

Next, the user terminal 10A constructs the room A based on the information (for example, background data, parameters of each virtual object, and the like) of the virtual space received from the server 20, generates an image from the viewpoint of the user A in the room A, and displays the image on the display unit 130A (step S118).

On the other hand, in the user terminal 10B, similarly, login by the user B and construction of the room B are performed, and an image from the viewpoint of the user B in the room B is displayed on the display unit 130B of the user terminal 10B (step S121).

Next, when the user A wants to interact with the user B in the room B which is another virtual space, the user terminal 10A makes an interaction request to the user B (user terminal 10B) via the server 20 according to the operation of the user A (steps S124 and S127). In this case, the case where the interaction request is made from the user A to the user B is illustrated as an example; however, the interaction request may be naturally made from the user B to the user A.

Subsequently, when receiving interaction permission from the user B (step S130), the server 20 installs the virtual camera and the virtual window in the room A and the room B, respectively (steps S133 and S136).

Then, the server 20 acquires the communication information by the virtual camera in each room (steps S139 and S142), transmits the acquired communication information to the other party's room (steps S145 and S151), and presents (display output or voice output) the communication information by the virtual window installed in the other party's room (steps S148 and S154). The communication information may be transmitted by live streaming. The standard used in such live streaming is not particularly limited. When only text or voice is acquired as the communication information, installation of the virtual camera (imaging position) in each room may be unnecessary.

As described above, the information processing system according to the present embodiment enables bidirectional interaction in a plurality of virtual spaces without spatial movement.

After the end of the interaction, the server 20 cancels the installation of the virtual window (deletes the settings of the virtual window and the virtual camera). The user A or the user B may instruct to end the interaction. The server 20 may always have a virtual window installed in each room. The server 20 may open the virtual window (start transmission and reception of the video and activate the interaction function) at the time of the interaction with a user in another room, and close the virtual window (end transmission and reception of the video and deactivate the interaction function) when the interaction ends.

Hereinabove, the operation processing of the information processing system according to the present embodiment has been specifically described. The content and order of each step illustrated in the sequence diagram of FIG. 7 are an example, and the present embodiment is not limited to this example.

For example, each room may not be an individual room but may be a virtual space where a user having a predetermined authority can enter, and may be constructed by the server 20. Although it has been described that the user moves from the lounge to each room, the present embodiment is not limited thereto, and the virtual space may not have a lounge, or an arbitrary room may be selected from the beginning after logging in to the virtual space. Although the example illustrated in FIG. 7 includes the "interaction request" and the "interaction permission" as triggers for starting the bidirectional interaction in the plurality of virtual spaces by installing the virtual window, the trigger for starting the bidirectional interaction is not limited thereto, and some other event may be used as a trigger.

4. Other Embodiments

Next, other embodiments according to the present disclosure will be described. In the embodiment described above, the bidirectional interaction in the plurality of virtual spaces is realized through the virtual window; however, the method of using the virtual window is not limited thereto, and for example, it is also possible to view a state of another virtual space through the virtual window (unidirectional communication of communication information). Specifically, for example, the server 20 performs control to display a captured image captured by the virtual camera disposed in another virtual space on the virtual window installed in a virtual space different from another virtual space by live streaming. Thus, it is possible to more easily present the communication information in another virtual space and enhance the convenience of the virtual space.

Hereinafter, an information processing system according to such another embodiment of the present disclosure will be specifically described with reference to FIGS. 8 to 12. As an example, a case is assumed in which a performer who is a distributor as a master client performs some event such as a music concert and a user who is a viewer as a general client participates in the virtual space. The master client is a user having a special authority different from that of the general client. For example, the master client can arbitrarily change the interior of the virtual space (selection of background, arrangement of each virtual object, and the like), can restrict entry and exit of general users to the virtual space, can control start and end of distribution from the virtual space, and can control the entire virtual space such as music to be played in the virtual space and lighting in the virtual space.

Figure 8:
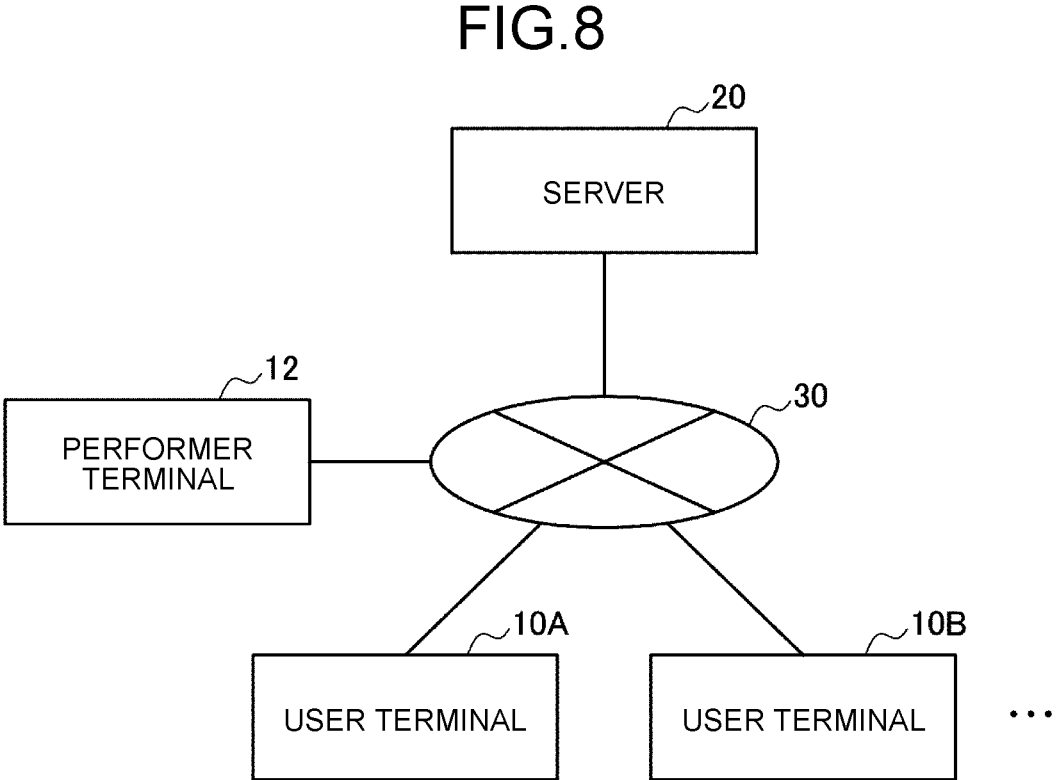
FIG. 8 is a diagram illustrating a configuration example of an information processing system according to another embodiment of the present disclosure.

As illustrated in FIG. 8, for example, a configuration of information processing according to another embodiment of the present disclosure includes a server 20, a user terminal 10 (user terminals 10A to 10B . . . ) used by each user, and a performer terminal 12 used by a performer (distributor) who is the master client. A basic configuration of the performer terminal 12 is similar to the configuration illustrated in FIG. 3. The motion of the performer is detected by a camera provided in the performer terminal 12 and a large number of cameras arranged around the performer, and is reflected in the motion of the avatar of the performer in the virtual space. The detected data may be data indicating three-dimensional motion of the performer. The expression of the performer may be tracked by the camera and reflected in the expression of the avatar of the performer in the virtual space. The voice of the performer may be collected by a microphone and output as the voice of the avatar of the performer. The performer terminal 12 may be realized by the non-transmissive HMD. The motion of the performer may be sensed by various sensors provided in a controller held by the performer and various sensors provided in a device worn by the performer. The avatar of the performer drawn in the virtual space may be a 2D live-action, may be a 3D CG that expresses a fictitious character or the like, or may be a 3D CG that is generated by the Volumetric Capture technology and is more similar to live-action.

Figure 9:
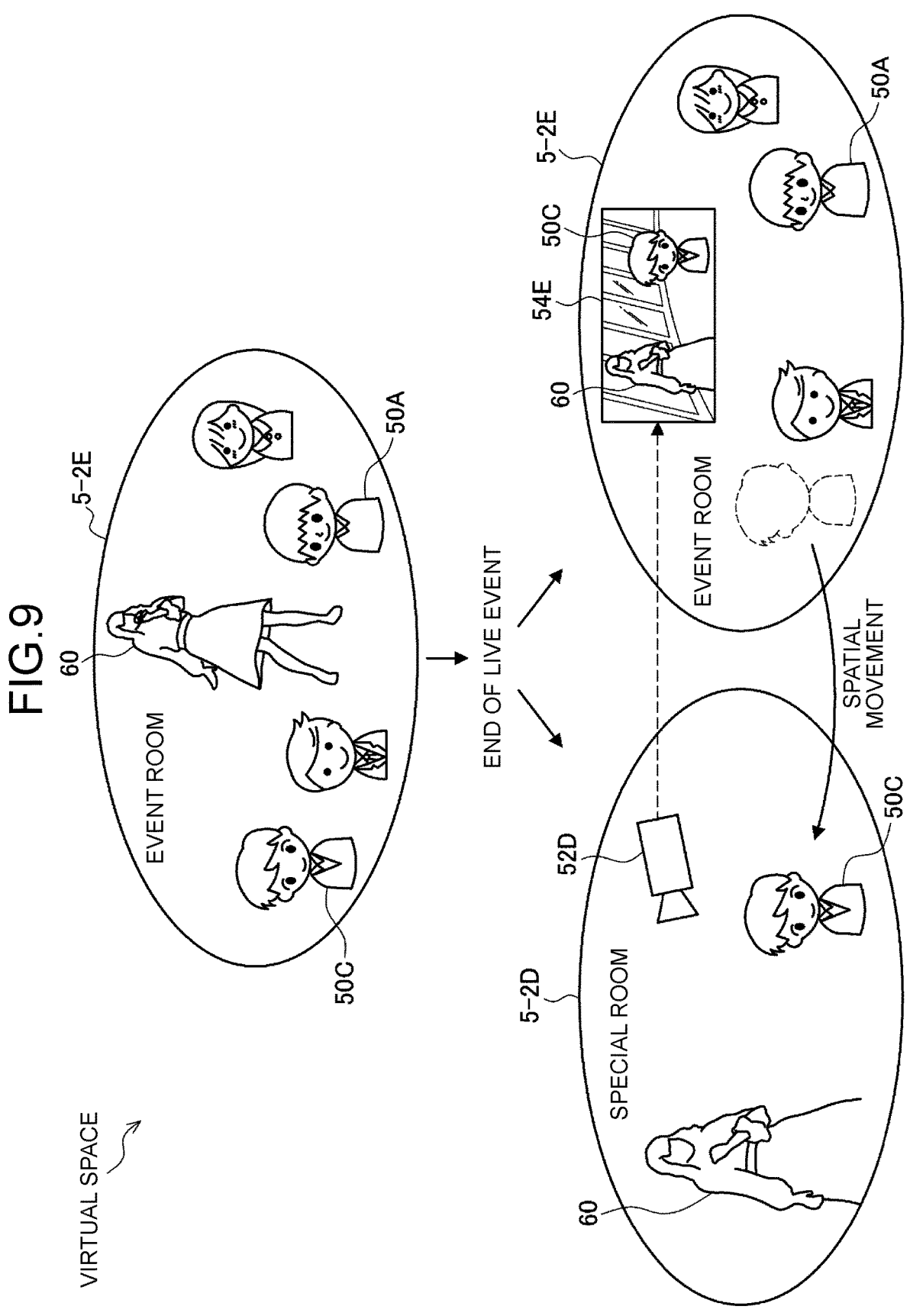
FIG. 9 is a diagram for explaining presentation of unidirectional communication information using a virtual window according to another embodiment.

FIG. 9 is a diagram for explaining presentation of unidirectional communication information using a virtual window according to another embodiment. As illustrated in FIG. 9, for example, it is assumed that a concert by a performer 60 is held in an event room 5-2E. The performer 60 and many general users 50 who are general viewers participate in the event room 5-2E. Next, when the concert held in the event room 5-2E ends, only a user 50C selected by the performer 60 from among the general viewers and the performer 60 move to a special room 5-2D with the end of the concert as a trigger. Then, the remaining general viewers stay in the event room 5-2E, and a state of the special room 5-2D is live-streamed through a virtual window 54E installed in the event room 5-2E. A video displayed on the virtual window 54E is a video captured by a virtual camera 52D disposed in the special room 5-2D.

As described above, in the information processing system according to another embodiment, when the venue branches with the end of a predetermined event, such as the end of a concert, as a trigger, control can be performed to present the state of another related virtual space through the virtual window in real time.

A method of selecting the user to move to the special room 5-2D is not particularly limited, and for example, the user may be selected according to a charge reward rate, the user who is most excited (large voice, large motion, and the like) may be selected by detecting excitement, the user pointed by the performer 60 in the virtual space may be selected, or the user whose name is called by the performer 60 and responds may be selected. A pointing gesture of the performer 60 (avatar) in the virtual space is controlled based on, for example, motion information of fingers of the performer 60 acquired from bone information of the performer 60 (human) in the real space. It is assumed that the server 20 draws the fingers of the avatar of the performer 60 in the special room 5-2D (virtual space) based on the motion information of the fingers of the performer 60 and selects the user colliding in a pointing direction.

Operation processing of such another embodiment will be described below with reference to FIG. 10.

(Operation Processing)

Figure 10:
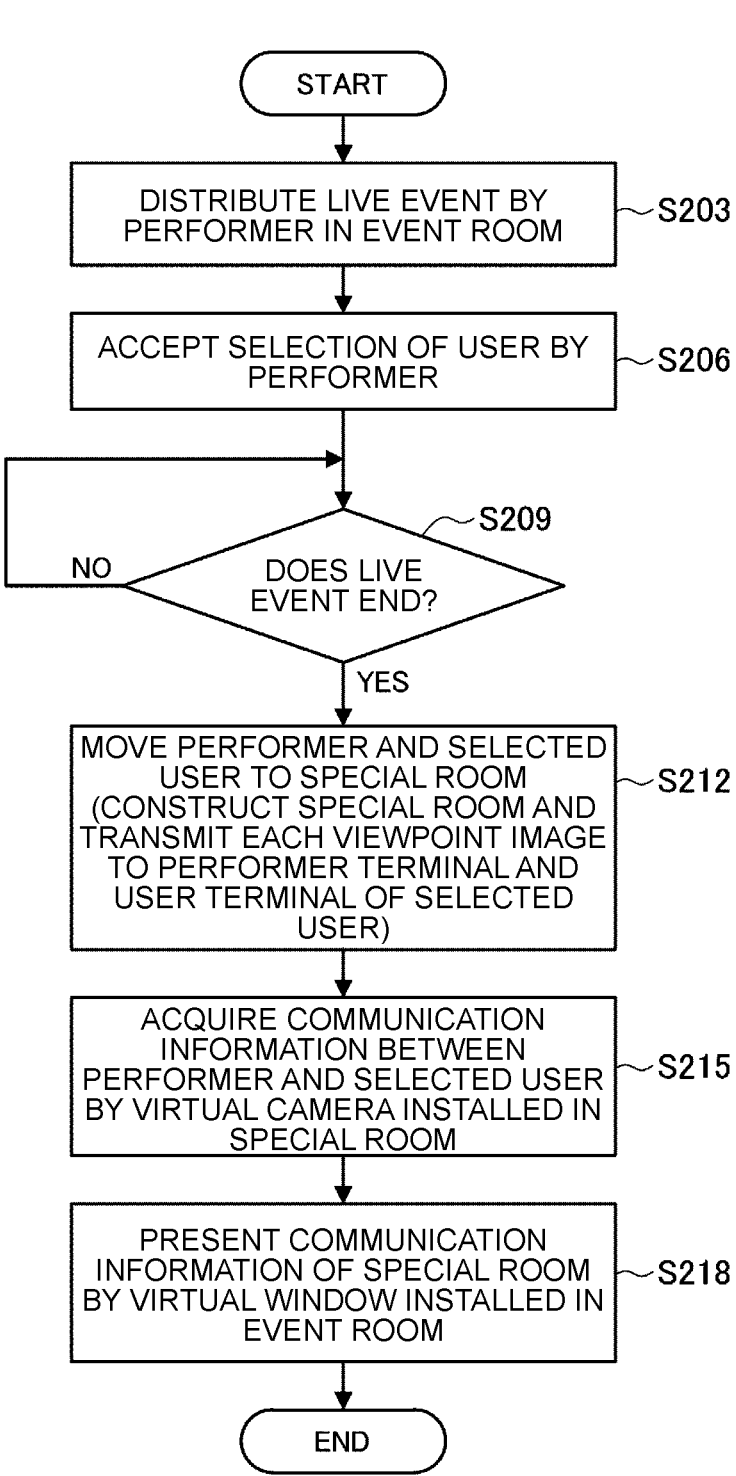
FIG. 10 is a flowchart illustrating an example of a flow of operation processing of the information processing system according to another embodiment.

FIG. 10 is a flowchart illustrating an example of a flow of the operation processing of the information processing system according to another embodiment of the present disclosure. As illustrated in FIG. 10, first, a live event (for example, live broadcast of a music concert or the like) by the performer 60 is performed in the event room 5-2E (step S203). For example, the server 20 controls the event room 5-2E in accordance with input information from the performer terminal 12 of the performer 60. More specifically, the server 20 constructs the event room 5-2E with a background and a virtual object selected by the performer 60, draws the avatar of the performer 60 in the event room 5-2E, controls the motion of the avatar of the performer 60 according to the motion of the performer 60, plays music in the event room 5-2E according to an instruction of the performer 60, and controls lighting. There may be a distributor having a predetermined authority other than the performer 60, and the distributor may appropriately instruct setting in the event room 5-2E. Further, the server 20 draws an avatar of each user (general viewer) participating in the event room 5-2E, and controls the motion of the avatar of each user according to the motion of each user. Further, the server 20 generates an image from the viewpoint of each user (general viewer) (for example, the viewpoint of the avatar of each user), and transmits the image to each of the user terminals 10 in real time (the image may be live-streamed). Furthermore, the server 20 generates an image from the viewpoint of the performer 60 (for example, the viewpoint of the avatar of the performer 60), and transmits the image to the performer terminal 12 in real time (the image may be live-streamed).

Next, the server 20 accepts the selection of the user by the performer 60 (step S206). The performer 60 can select a user to move to the special room from among the users (general viewers) participating in the event room 5-2E. The number of users to be selected may be one or two or more. Although it is described here that the performer 60 selects as an example, the distributor having a predetermined authority existing separately from the performer 60 may select the user, or the server 20 may automatically select the user based on a predetermined condition.

Next, when the live event ends (step S209/Yes), the server 20 moves the performer 60 and the selected user to the special room 5-2D (step S212). Such movement is spatial movement. The server 20 constructs the special room 5-2D, and draws the avatar of the performer 60 and the avatar of the selected user (the user 50C in the example illustrated in FIG. 9) in the special room 5-2D.

Furthermore, the server 20 transmits images of the respective viewpoints (viewpoint of the performer 60, viewpoint of the user 50C) in the special room 5-2D to the performer terminal 12 and the user terminal of the selected user. The selected user 50C moves to the special room 5-2D, and thus can interact with the performer 60 who has also moved to the special room 5-2D.

Next, the server 20 acquires communication information (voice and video) between the performer and the user 50C by the virtual camera 52D installed in the special room 5-2D (step S215). That is, the server 20 captures an image of a state in which the performer and the user 50C are interacting with each other by the virtual camera 52D, and acquires the captured image. The arrangement place of the virtual camera 52D is not particularly limited, and for example, the server 20 may dispose the virtual camera 52D so as to capture an image of the performer 60 and the user 50C from a position for getting a bird's-eye view of them. Alternatively, the server 20 may dispose the virtual camera 52 D from the viewpoint of the user 50C who interacts with the performer 60, or may dispose the virtual camera 52D at a position where only the image of the performer 60 is captured in close proximity. A plurality of the virtual cameras 52D may be installed in the special room 5-2D, and a staff on the distributor side may arbitrarily switch.

Then, the server 20 presents the communication information of the special room 5-2D from the virtual window 54E installed in the event room 5-2E which is the virtual space related to the special room 5-2D (step S218). The virtual window 54E installed in the event room 5-2E may be realized by a large screen (virtual object) and disposed above the space so as to be visible to a large number of general audience users remaining in the event room 5-2E.

Figure 11:
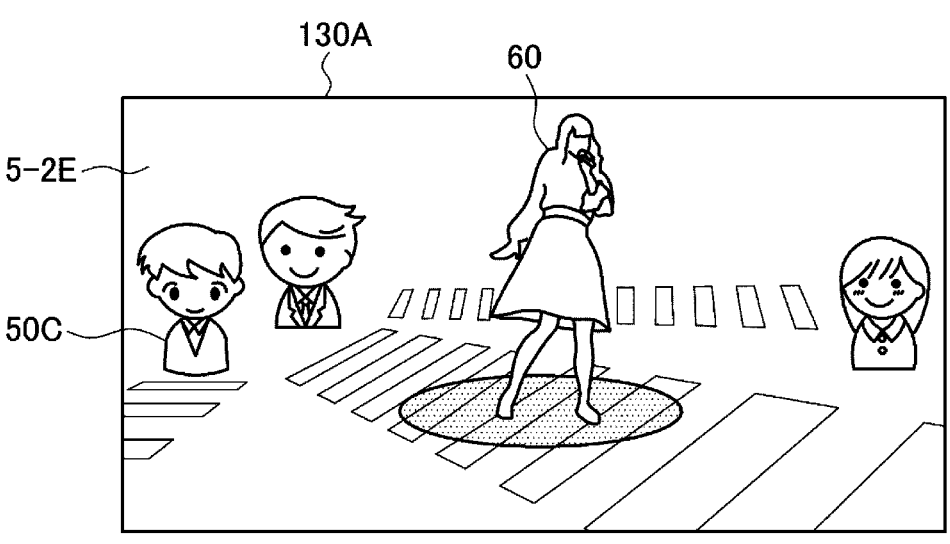
FIG. 11 is a diagram illustrating a display example of an image from a user's viewpoint in a virtual space in which the virtual window is disposed according to another embodiment.
Figure 11:
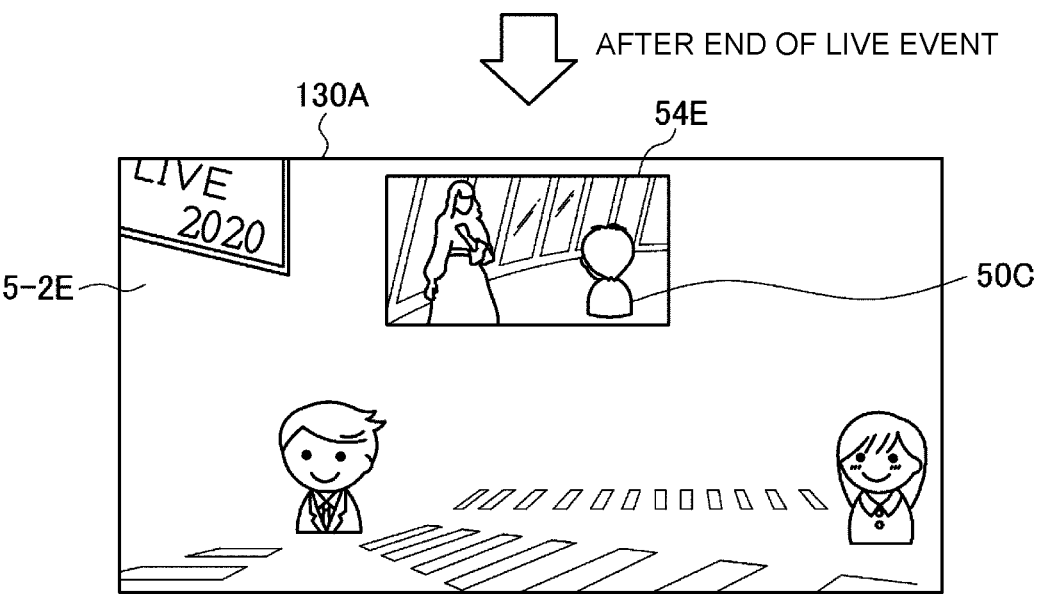

Here, FIG. 11 illustrates a display example of an image from the viewpoint of the user 50A in the virtual space (event room 5-2E) in which the virtual window 54E is disposed according to another embodiment. The diagram illustrated in FIG. 11 is an image of the viewpoint of the user 50A when a live event such as a music concert is performed by the performer 60 in the event room 5-2E. Such an image can be displayed on the display unit 130A of the user terminal 10A.

Next, when the live event ends, the performer 60 and the selected user 50C move to another virtual space (special room 5-2D) branched from the event room 5-2E. Thus, in the event room 5-2E, the performer 60 and the selected user 50C are absent. Then, an image illustrated in a lower part of FIG. 11 is displayed on the display unit 130A of the user terminal 10A. The image illustrated in the lower part of FIG. 11 is an image of the viewpoint of the user 50A in the event room 5-2E (virtual space) in which the virtual window 54E for displaying the video of the special room 5-2D in real time is disposed.

As described above, according to the information processing system according to another embodiment, a state in which a plurality of other users are communicating in another virtual space branched from the virtual space in which the user is present can be viewed in real time via the virtual window 54 disposed in the virtual space in which the user is present without accompanying spatial movement.

Figure 12:
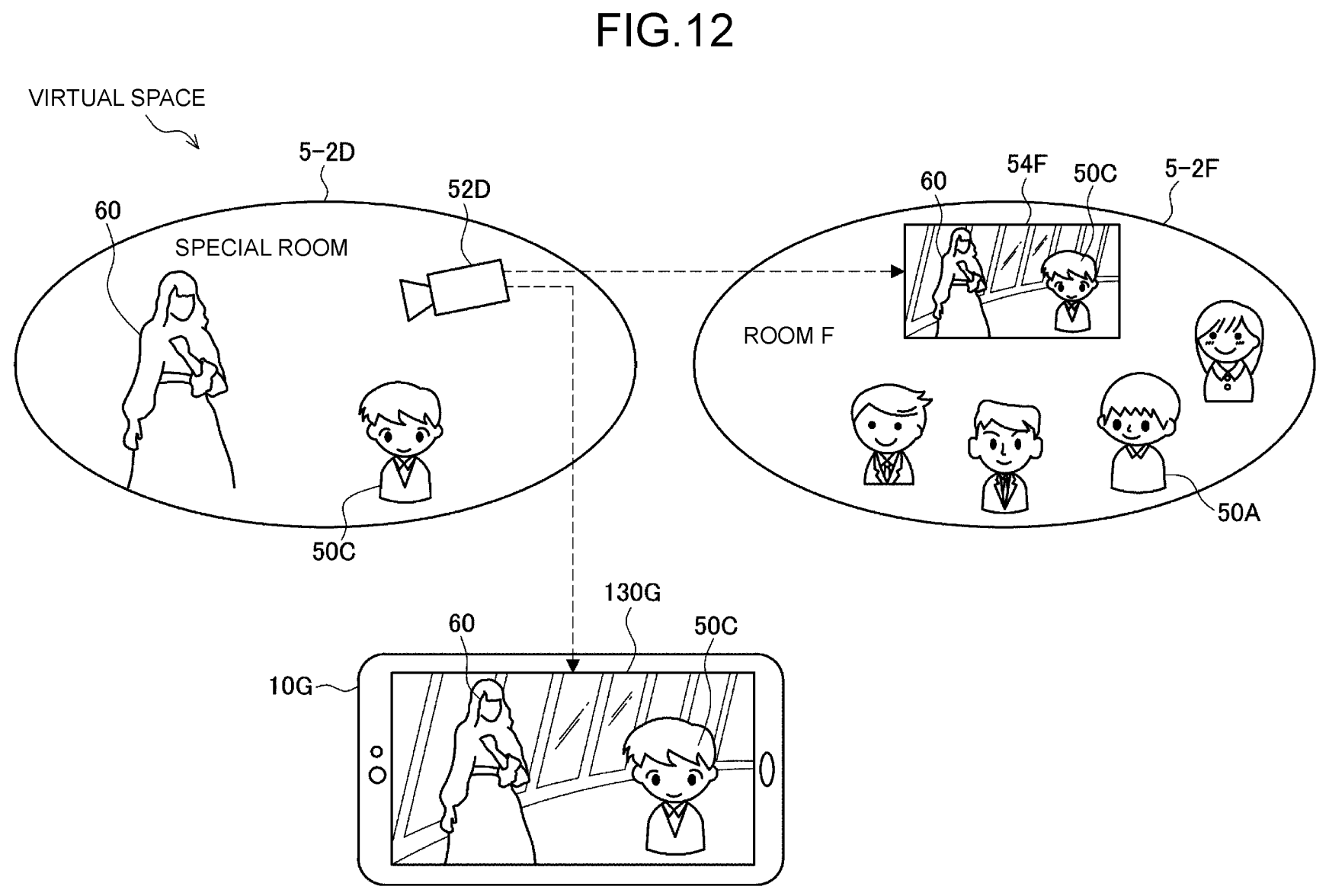

In the above-described embodiment, after the live event ends, the virtual window 54E is disposed in the event room 5-2E, and the communication information of the special room 5-2D is presented through the virtual window 54E; however, the present embodiment is not limited thereto. FIG. 12 is a diagram for explaining another presentation example of the communication information of the special room 5-2D according to another embodiment. For example, the server 20 may close the event room 5-2E with the end of the live event as a trigger, and move the general audience user who has been in the event room 5-2E to another room F as illustrated in FIG. 12. The other room F is positioned outside the event venue, and may be, for example, a goods sales venue that sells goods of the event. Although only ticket purchasers can enter the event venue, anyone may enter the goods sales venue. Furthermore, the other room F may be positioned as a viewing room (sub room) in which the state of the special room 5-2D can be seen. Alternatively, the other room F may be a lounge (see FIG. 2) positioned as the center of the virtual space. In addition, the communication information acquired in the special room 5-2D is not limited to the presentation in the virtual window 54E disposed in the virtual space, and may be presented (live-streamed) on a user terminal 10G realized by a display device such as a smartphone, a tablet terminal, a transmissive eyeglass type display, a PC, a TV device, or a projection device as illustrated in FIG. 12. This makes it possible to increase the number of viewers.

In the above-described embodiment, "the end of the live event" has been described as the trigger for starting the processing of unidirectionally distributing the communication information of another virtual space branched from the virtual space from the virtual window disposed in the virtual space; however, such a trigger is an example, and the present embodiment is not limited thereto. The end of another predetermined event may be used as a trigger, the start of a predetermined event may be used as a trigger, the lapse of a predetermined time may be used as a trigger, or the occurrence of a predetermined event may be used as a trigger.

5. Application Example

Hereinafter, application examples of the present embodiment will be described.

In the above-described embodiment described with reference to FIG. 4, the system capable of easily performing the bidirectional interaction between single users in each virtual space without spatial movement has been described; however, the present embodiment is not limited thereto, and the bidirectional interaction can be performed between N people in a first virtual space and N people in a second virtual space via the virtual window.

Figure 13:
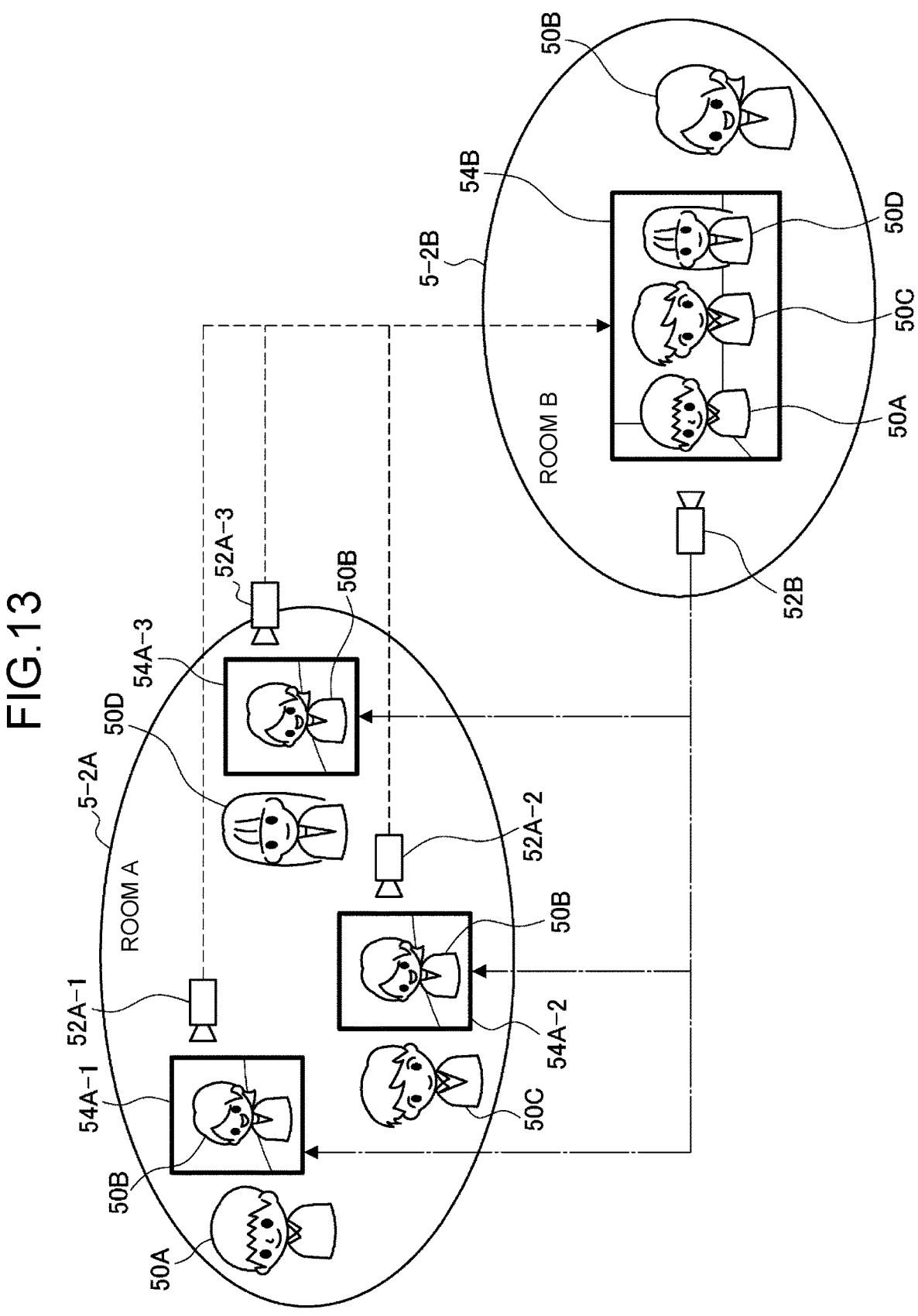
FIG. 13 is a diagram for explaining bidirectional interaction between the virtual spaces in a case where a plurality of people are present in at least one virtual space according to an application example of the present embodiment.

FIG. 13 is a diagram for explaining the bidirectional interaction between the virtual spaces in a case where a plurality of people are present in at least one virtual space according to an application example of the present embodiment. As illustrated in FIG. 13, for example, even when there are three people in the room A and one person in the room B, it is possible to perform the bidirectional interaction between the room A and the room B via the virtual window 54. Specifically, the server 20 arranges virtual cameras 52A-1 to 52A-3, which capture images of the users 50A, 50C, and 50D in the room A, in the room A, respectively, and performs control to display captured images obtained by the virtual cameras 52A-1 to 52A-3 in real time in the virtual window 54B of the room B. When a plurality of persons are displayed in the virtual window 54B, the server 20 may use the background of one of the plurality of users as the background, and the other users may be combined and displayed with the background removed, or images of three persons may be displayed side by side. When the images of the three persons are displayed side by side, the server 20 may preferentially display the image of the user who is speaking in a larger size. A camera angle for capturing images of a plurality of users in the room A may be matched with the line of sight of each user as illustrated in FIG. 13 (image of each user is captured from the front), or the images of the plurality of users may be captured by one virtual camera from a viewpoint of getting a bird's-eye view of the plurality of users. The camera angle may be arbitrarily switched by a user operation (gesture operation, button operation, voice input operation, and the like).

Figure 14:
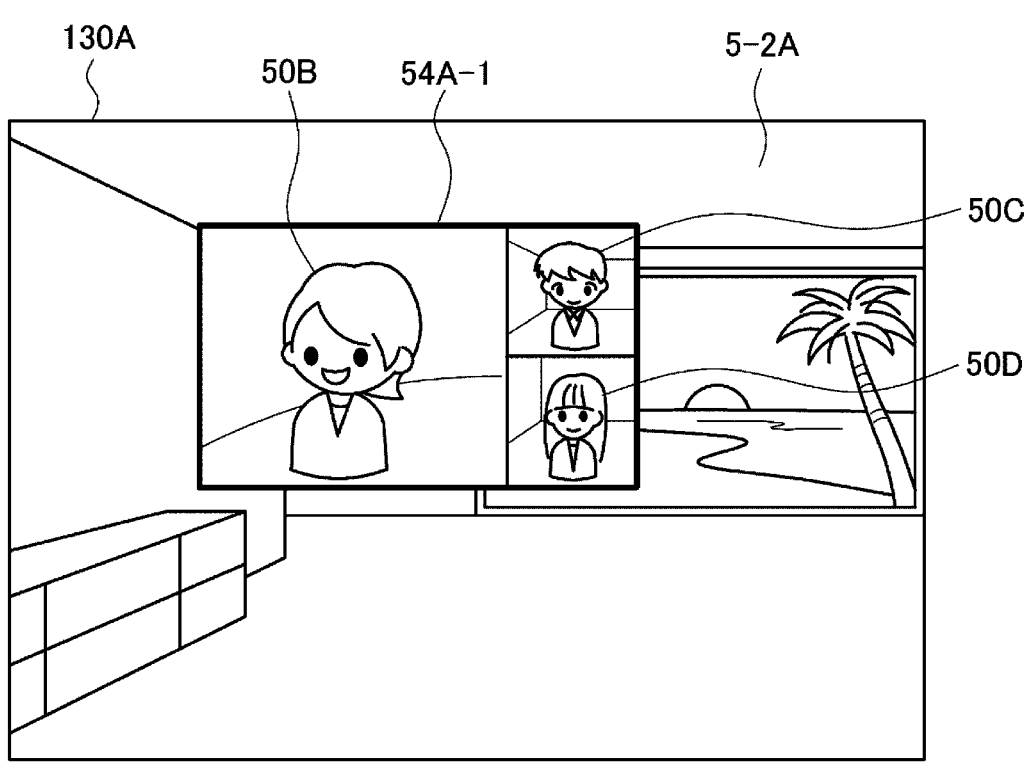
FIG. 14 is a diagram illustrating another example of the image from the user's viewpoint in a room illustrated in FIG. 13.

The video of the user 50B captured by the virtual camera 52B disposed in the room B is displayed in the virtual windows 54A-1 to 54A-3 arranged in the room A. As illustrated in FIG. 13, the camera angle of the user 50B may be matched with the line of sight of the user 50B (image of the user 50B is captured from the front), or the image of the user 50B may be captured from a viewpoint of getting a bird's-eye view of the user 50B. Furthermore, the virtual windows 54A-1 to 54A-3 arranged in the room A may display not only the video of the room B but also the videos of all the users participating in the interaction in the same room A (that is, the videos of the same virtual space). FIG. 14 is a diagram illustrating another example of the image from the viewpoint of the user 50A in the room A illustrated in FIG. 13. As illustrated in FIG. 14, on the display unit 130A of the user terminal 10A of the user 50A, an image obtained by capturing the user 50B (avatar) in the room B, a captured image of the user 50C (avatar) in the same room A participating in the interaction, and a captured image of the user 50D (avatar) are displayed in real time in the virtual window 54A-1 disposed in the room A (virtual space).

(Others)

The image displayed in the virtual window 54 is not limited to the captured image in real time in the virtual space, and any image (still image and moving image) may be displayed by a user operation (image sharing). The shared image may be an image related to the user participating in the interaction (for example, a video of an event in which all the users have participated).

In addition to the interaction participant, a staff AI (artificial intelligence) may be added to the virtual window 54, and the interaction may be facilitated by the staff AI. The staff AI is a character that can automatically interact with the user by natural language processing or the like prepared by the system side.

The angle of the virtual camera 52 that captures an image to be displayed on the virtual window 54 is not particularly limited. The plurality of virtual cameras 52 may be arranged for one user so that the user can arbitrarily switch the camera angle.

6. Supplement

As described above, in the information processing apparatus according to the embodiment of the present disclosure, it is possible to more easily present the communication information in another virtual space and enhance the convenience of the virtual space.

The preferred embodiments of the present disclosure have been described in detail above with reference to the accompanying drawings, but the present technology is not limited to such examples. It is obvious that a person having ordinary knowledge in the technical field of the present disclosure can conceive various changes or modifications within the scope of the technical idea described in the claims, and it is naturally understood that these also belong to the technical scope of the present disclosure.

For example, the information processing system according to the present embodiment can be applied to a wide range of areas such as entertainment, education, sports, business, work support, architecture, research, medical care, volunteer activities, ceremonial occasions, public institutions, financial institutions, disasters, and space development.

Specifically, when a class is conducted remotely in an educational institution such as a cram school or a school, the class from a classroom in the virtual space can be viewed through the virtual window in an own room in the virtual space. A conversation (communication information between a teacher and a student in a question room) of the student who individually asks a question to the teacher in the question room (virtual space in which only the student having a question can move and ask a question to the teacher after a class ends) may be live-streamed to a virtual window installed in a classroom (virtual space) after the class ends. Other students remaining in the classroom can immediately view a state of the question without moving to the question room.

The information processing system according to the present embodiment can also be applied to a case where an instructor at a remote location gives an instruction by non-verbal communication (for example, an instruction by a gesture or the like) of work to a worker. Regarding the gesture of the instructor, fine motion of the hand is detected by, for example, a camera or a sensor worn by the hand, and a virtual object of the finely moving hand can be drawn in the virtual space. The work to be instructed may be work in the virtual space or work in a real space. In the case of the work in the virtual space, a state in which the instructor gives an instruction by non-verbal communication in another virtual space is displayed on the virtual window disposed in the virtual space; therefore, the worker can perform the work in the virtual space while receiving the instruction from the instructor displayed on the virtual window. In the case of the work in the real space, the worker may wear the transmissive HMD (for example, a transmissive eyeglass type display) and AR-display the virtual window.

As described above, the avatar drawn in the virtual space according to the present embodiment may be a 3D CG (hereinafter, also referred to as a volumetric avatar) that is generated by the Volumetric Capture technology and is more similar to live-action. When the volumetric avatar is used, it is possible to confirm the motion of the entire body and the motion of the fingertip of the user in detail. Therefore, for example, a training coach, a teacher of a golf school, or the like can teach a correction portion of a body motion by watching the whole-body motion of the volumetric avatar as a student. A state in which a teacher (who does not necessarily have to be the volumetric avatar, but is preferably the volumetric avatar when showing an example) instructs a student (volumetric avatar) in an individual instruction room may be live-streamed to a virtual window disposed in a virtual space such as a standby room where another student waits.

It is also possible to use it for counseling or conversation of medical care of a patient waiting in line for medical examination. For example, it is possible to perform the bidirectional interaction with a doctor in another room (another virtual space) via the virtual window installed in a waiting room where the patient waiting in line for medical examination is present.

In the above-described embodiment, the case where the bidirectional interaction and the unidirectional distribution between the rooms movable from the lounge positioned at the center of the virtual space are performed via the virtual window has been described; however, the present disclosure is not limited thereto. For example, it is also possible to perform the bidirectional interaction or the unidirectional distribution between the virtual spaces that exist individually and where a user cannot move back and forth (or that have no place that can be shared such as a lounge) via the virtual window.

Even in the same virtual space, the bidirectional interaction or the unidirectional distribution may be performed via the virtual window with another user who is at a distant place, a place where it takes time to move, or the like. The moving time to the place where the other party user is present is omitted, and the convenience of the virtual space is enhanced.

The user terminal 10 is not limited to the non-transmissive HMD, and may be transmissive AR glasses. The virtual window (virtual object) may be subjected to AR (Augmented Reality) display (superimposed display in the real space). As a result, at the time of interacting with another user in the virtual space, a processing load of constructing the virtual space in the user terminal 10 or the server 20 is omitted. The information processing system according to the present embodiment is applicable to XR experiences such as VR, AR, and MR (Mixed Reality).

The bidirectional interaction and the unidirectional distribution do not have to be performed between two virtual spaces, and can be performed between three or more virtual spaces via the virtual window.

The communication information presented in the virtual window is not limited to a two-dimensional video, and may be a 3D video (stereoscopic video). When the display unit 130 of the user terminal 10 includes left and right screens fixed respectively to the left and right eyes of the user and has the function of displaying the left-eye image and the right-eye image, it is possible to provide a stereoscopic video. The stereoscopic video acquired from another virtual space may be a stereoscopic image of 360 degrees or a stereoscopic image of 180 degrees. In the stereoscopic video acquired from another virtual space, a Top and Bottom scheme in which vertical arrangement is performed may be used, or a Side by Side scheme in which horizontal arrangement is performed may be used. The server 20 distributes the stereoscopic video of another virtual space to the virtual space by stereoscopic VR streaming. At this time, for example, the server 20 draws the stereoscopic video of another space at the center of the visual field at the user's viewpoint and draws the background of the virtual space where the user is present at the periphery thereof, so that it is possible to view the video of another virtual space in the virtual space where the user is present without moving to the space.

It is also possible to create one or more computer programs for causing hardware, such as the CPU, the ROM, and the RAM built in the user terminal 10 or the server 20 described above, to exhibit the functions of the user terminal 10 or the server 20. A computer-readable storage medium storing the one or more computer programs is also provided.

Furthermore, the effects described in the present specification are merely illustrative or exemplary, and are not restrictive. That is, the technology according to the present disclosure can exhibit other effects obvious to those skilled in the art from the description of the present specification, together with or instead of the above effects.

The present technology may also be configured as below.

(1)

An information processing apparatus comprising a control unit that controls display of a virtual space, wherein the control unit performs control to acquire communication information of one or more other users in another virtual space and present the acquired communication information by a virtual object disposed in the virtual space.

(2)

The information processing apparatus according to (1), wherein the control unit performs control to acquire the communication information of one or more users in the virtual space and output the communication information to the another virtual space.

(3)

The information processing apparatus according to (1) or (2), wherein the control unit performs control to acquire the communication information of a plurality of other users performed in the another virtual space and present the communication information by the virtual object disposed in the virtual space.

(4)

The information processing apparatus according to any one of (1) to (3), wherein the communication information includes at least one of a captured image, a text, and a voice.

(5)

The information processing apparatus according to any one of (1) to (4), wherein the control unit performs control to display, on the virtual object, one or more captured images captured in the another virtual space included in the communication information.

(6)

The information processing apparatus according to any one of (1) to (5), wherein the control unit performs control to dispose a virtual camera at a position facing a viewpoint of a user in the virtual space and output a captured image of an avatar of the user, captured by the virtual camera, as the communication information of the user to the another virtual space.

(7)

The information processing apparatus according to any one of (1) to (6), wherein the control unit performs control to acquire the communication information of one or more other users in the another virtual space branched from the virtual space with end of a predetermined event as a trigger, and present the communication information by the virtual object disposed in the virtual space.

(8)

The information processing apparatus according to (7), wherein the control unit performs control to move one or more specific users among one or more users who have been in the virtual space to the another virtual space when the another virtual space is branched.

(9)

The information processing apparatus according to any one of (1) to (8), further comprising a communication unit, wherein the control unit performs control to generate an image from a viewpoint of the user in the virtual space and transmit the image from the communication unit to an information processing terminal of the user.

(10)

The information processing apparatus according to any one of (1) to (8), further comprising a display unit, wherein the control unit performs control to generate an image from a viewpoint of the user in the virtual space and display the image on the display unit.

(11)

An information processing system comprising:

an information processing terminal including a display unit and a communication unit; and an information processing apparatus including a control unit that controls display of a virtual space on the display unit, and a communication unit, wherein the control unit performs control to acquire communication information of one or more other users in another virtual space and present the acquired communication information by a virtual object disposed in the virtual space displayed on the display unit.

(12)

An information processing method comprising:

controlling display of a virtual space by a processor; and performing control to acquire communication information of one or more other users in another virtual space and present the acquired communication information by a virtual object disposed in the virtual space.

(13)

An information processing terminal comprising:

a communication unit;

a display unit; and a control unit that performs control to display an image of a virtual space, received from an information processing apparatus by the communication unit, on the display unit, wherein the control unit displays an image in which communication information of one or more other users in another virtual space is presented by a virtual object disposed in the virtual space.

REFERENCE SIGNS LIST

10 USER TERMINAL
100 CONTROL UNIT
110 COMMUNICATION UNIT
120 SENSOR UNIT
122 CAMERA
124 MICROPHONE
126 MOTION SENSOR
130 DISPLAY UNIT
140 SPEAKER
150 STORAGE UNIT
20 SERVER
200 CONTROL UNIT
201 VIRTUAL SPACE INFORMATION PROVIDING UNIT
202 VIRTUAL WINDOW CONTROL UNIT
210 COMMUNICATION UNIT
220 STORAGE UNIT

The invention claimed is:

1. An information processing apparatus comprising:
circuitry configured to
    control a display to display a first virtual space,
    acquire communication information of a user in a second virtual space, and control the display to display an image of the user or an avatar of the user in the second virtual space via a virtual window object in the first virtual space, wherein the acquired communication information of the user in the second virtual space includes non-verbal communication.

2. The information processing apparatus according to claim 1, wherein the circuitry is further configured to control to output the communication information of the user in the second virtual space to the first virtual space.

3. The information processing apparatus according to claim 1, wherein the circuitry is further configured to control the display to display the first virtual space based on a virtual camera at a position facing a viewpoint of a user in the first virtual space, and control the display to display a captured image of an avatar of the user, captured by the virtual camera, as the communication information of the user in the second virtual space.

4. The information processing apparatus according to claim 1, wherein the circuitry is further configured to acquire the communication information of one or more other users in the second virtual space branched from the first virtual space with an end of a predetermined event as a trigger, and control to present the communication information of the one or more other users via the virtual window object in the first virtual space.

5. The information processing apparatus according to claim 4, wherein the circuitry is further configured to control to move one or more specific users among one or more users who have been in the first virtual space to the second virtual space when the second virtual space is branched from the first virtual space.

6. The information processing apparatus according to claim 1, wherein the circuitry is further configured to control the display to display an image of a viewpoint of a user in the first virtual space, and control to transmit the image to a second information processing apparatus different from the information processing apparatus.

7. The information processing apparatus according to claim 1, wherein the circuitry is further configured to control to switch a viewpoint of the user based on a user operation.

8. The information processing apparatus according to claim 1, wherein the communication information includes at least one of a still image, a movie, a voice, or a text.

9. The information processing apparatus according to claim 1, wherein the information processing apparatus is a non-transmissive Head Mounted Display (HMD).

10. The information processing apparatus according to claim 1, further comprising:

a first camera configured to capture an image of a real space; and a second camera configured to capture an image of an eye of the user or an image of a face of the user, wherein the circuitry is further configured to apply an expression of the user to the avatar of the user based on the image captured by the second camera.

11. The information processing apparatus according to claim 1, wherein the circuitry is further configured to control, based on a user operation, the display to display a shared image via the virtual window object in the first virtual space.

12. The information processing apparatus according to claim 1, wherein the displayed image of the user is controlled by changing a camera angle according to one or more gestures determined based on detected motion of the user included in the non-verbal communication.

13. An information processing method comprising:

controlling a display to display a first virtual space;

acquiring communication information of a user in a second virtual space; and controlling the display to display an image of the user or an avatar of the user in the second virtual space via a virtual window object in the first virtual space, wherein the acquired communication information of the user in the second virtual space includes non-verbal communication.

14. The information processing method according to claim 13, further comprising:

controlling to output the communication information of the user in the second virtual space to the first virtual space.

15. The information processing method according to claim 13, further comprising:

controlling to switch a viewpoint of the user based on a user operation.

16. The information processing method according to claim 13, wherein the communication information includes at least one of a still image, a movie, a voice, or a text.

17. The information processing method according to claim 13, wherein an information processing apparatus configured to execute the method includes a non-transmissive Head Mounted Display (HMD).

18. The information processing method according to claim 13, further comprising:

a first camera configured to capture an image of a real space, and a second camera configured to capture an image of an eye of the user or an image of a face of the user, wherein the information processing method further comprises applying an expression of the user to the avatar of the user based on the image captured by the second camera.

19. The information processing method according to claim 13, further comprising:

controlling, based on a user operation, the display to display a shared image via the virtual window object in the first virtual space.

20. A non-transitory computer-readable storage medium having embodied thereon a program, which when executed by a computer causes the computer to execute a method, the method comprising:

controlling a display to display a first virtual space;

acquiring communication information of a user in a second virtual space; and controlling the display to display an image of the user or
an avatar of the user in the second virtual space via a
virtual window object in the first virtual space,
wherein the acquired communication information of the
user in the second virtual space includes non-verbal
communication.

* * * * *